(12) United States Patent
Warren

(10) Patent No.: US 7,839,963 B2
(45) Date of Patent: Nov. 23, 2010

(54) ISOCHRONOUS SYNCHRONIZER

(75) Inventor: Robert Geoffrey Warren, Bristol (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 931 days.

(21) Appl. No.: 11/635,384

(22) Filed: Dec. 7, 2006

(65) Prior Publication Data
US 2007/0268990 A1 Nov. 22, 2007

(30) Foreign Application Priority Data
Dec. 16, 2005 (EP) .................... 05257786

(51) Int. Cl.
*H04L 7/00* (2006.01)
(52) U.S. Cl. ..................................... 375/355
(58) Field of Classification Search .......... 375/353, 375/354, 371, 355
See application file for complete search history.

(56) References Cited

U.S. PATENT DOCUMENTS

| | | | |
|---|---|---|---|
| 5,099,477 A * | 3/1992 | Taniguchi et al. | 370/501 |
| 2004/0051569 A1 * | 3/2004 | Jeon | 327/153 |
| 2004/0066870 A1 * | 4/2004 | Gabara et al. | 375/354 |
| 2005/0008111 A1 * | 1/2005 | Suzuki | 375/371 |
| 2005/0229127 A1 | 10/2005 | Warren | |

FOREIGN PATENT DOCUMENTS

EP 0 511 836 A2 11/1992

OTHER PUBLICATIONS

Communication pursuant to Article 94(3) EPC dated Aug. 25, 2008 in European Patent Application No. 05 257 786.3.

* cited by examiner

*Primary Examiner*—Don N Vo

(57) ABSTRACT

Circuitry for synchronizing communications between clock environments wherein a change of state is transmitted from a first clock environment to a second clock environment, the first clock environment being timed by a first clock signal and the second clock environment being timed by a second clock signal, the first and second clock signals having nominally the same frequency but an unknown phase relationship, the circuitry comprising: delay means in the first clock environment arranged to generate a plurality of timing signals by delaying said first clock signal by respectively different delay values; sampling means in the second clock environment for sampling said plurality of timing signals at timing determined by said second clock signal thereby generating a plurality of sampled timing signals; and determining means for generating a control signal based on said plurality of sampled timing signals and outputting said control signal for controlling the transfer time of said change of state.

20 Claims, 14 Drawing Sheets

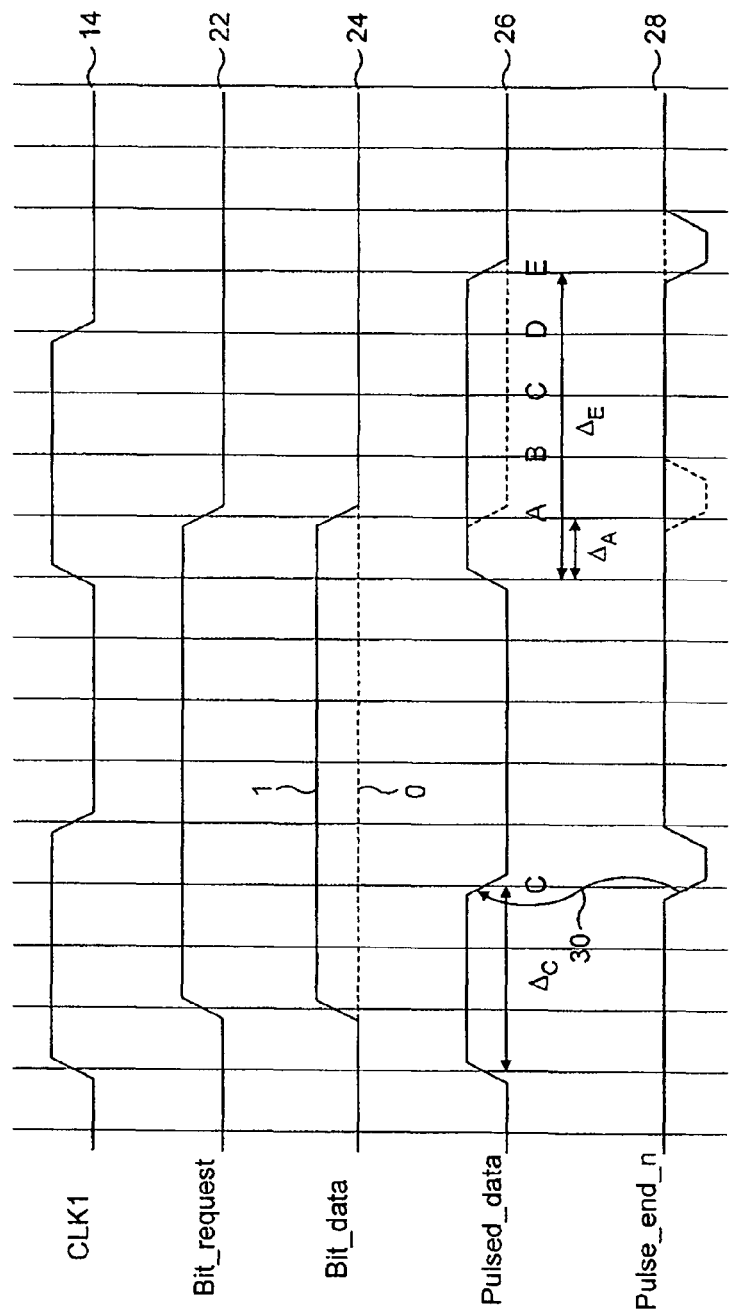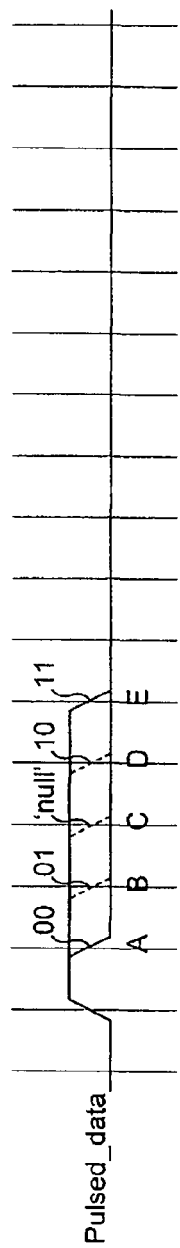
FIG. 2
FIG. 2A

ENCODER CIRCUITRY

ISOCHRONOUS SYNCHRONIZER

CROSS-REFERENCE TO RELATED APPLICATIONS

The present application is related to European Patent Application No. 05257786.3, filed Dec. 16, 2005, entitled "ISOCHRONOUS SYNCHRONIZER". European Patent Application No. 05257786.3 is assigned to the assignee of the present application and is hereby incorporated by reference into the present disclosure as if fully set forth herein. The present application hereby claims priority under 35 U.S.C. §119(a) to European Patent Application No. 05257786.3.

TECHNICAL FIELD

The present disclosure relates to the synchronization of signals between clock environments, and in particular to the synchronization of signals between clock environments where the clock environments are isochronous.

BACKGROUND

Synchronizers are used to capture signals that cross from one clock environment to a different clock environment. Synchronizers are necessary to avoid the problem of metastability which can occur when clock environments have timing edges occurring at different times. For example the clock signals in the two environments may be of different frequency, and they may be out of phase with each other. Generally such synchronizers consume a number of clock cycles to overcome metastability issues.

The number of consumed clock cycles depends on the clock frequencies involved in order to meet the required metastability settling time. The metastability settling time is a fixed time allocated such that the probability of metastability extending beyond this time is acceptably low. The settling time is largely technology independent and depends mainly on the statistical analysis of the product lifetime and reliability requirements. If the clock frequency is unknown, or can vary, then the implementation has to consume the number of clock cycles appropriate for the highest clock frequency. This means an unnecessarily large delay for lower clock frequencies.

Although the area overhead of passing a large number of signals across a clock boundary can be reduced by only passing a control signal through synchronizers instead of passing each signal through synchronizers, the delay is still incurred for all the signals associated with such a control signal.

SUMMARY

It is an aim of embodiments of the present disclosure to at least partially address these above problems known in the prior art.

In one embodiment, the present disclosure provides circuitry for synchronizing communications between clock environments. A change of state is transmitted from a first clock environment to a second clock environment. The first clock environment is timed by a first clock signal and similarly the second clock environment is timed by a second clock signal. The first and second clock signals have nominally the same frequency but an unknown phase relationship. The circuitry includes a delay circuit in the first clock environment arranged to generate a plurality of timing signals by delaying said first clock signal by respectively different delay values. The circuitry also includes a sampler in the second clock environment for sampling said plurality of timing signals at timing determined by said second clock signal thereby generating a plurality of sampled timing signals. The circuitry further includes a determining circuit for generating a control signal based on said plurality of sampled timing signals and outputting said control signal for controlling the transfer time of said change of state.

In another embodiment, the present disclosure provides a method of synchronizing communications between clock environments. A change of state is transmitted from a first clock environment to a second clock environment. The first clock environment is timed by a first clock signal and the second clock environment is timed by a second clock signal. The first and second clock signals have nominally the same frequency but an unknown phase relationship. The method includes generating, in the first clock environment, a plurality of timing signals by delaying said first clock signal by respectively different delay values. The method also includes sampling, in said second clock environment, said plurality of timing signals at timing determined by said second clock signal thereby generating a plurality of sampled timing signals. The method further includes generating a control signal based on said plurality of sampled timing signals and outputting said control signal for controlling the transfer time of said change of state.

In still another embodiment, the present disclosure provides isochronous synchronizer to synchronize communications between clock environments. A change of state is transmitted from a first clock environment to a second clock environment. The first clock environment is timed by a first clock signal and the second clock environment is timed by a second clock signal. The first and second clock signals have nominally the same frequency but an unknown phase relationship. The isochronous synchronizer includes a first circuit to detect a metastability risk caused by the relative timing of the first and second clock signals. The isochronous synchronizer also includes a second circuit to generate a control signal based on said detected metastability risk and outputting said control signal for controlling the transfer time of said change of state.

The first and second clock environments have nominally the same clock frequency. This includes the case in which the clock frequencies are of exactly the same frequency, derived from the same phase locked loop. It also includes the case in which the clock frequencies are nominally the same, but because the clock sources are derived from completely independent clock circuitry, for example not on the same chip, using separate phase locked loops, or using separate reference (crystal) sources, the frequencies are not identical, meaning that the phase difference between the signals will be slowly drifting.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which:

FIG. 2 illustrates data and timing signals encoded according to one example of a pulsed serial link according to one embodiment of the present disclosure;

FIG. 2A is the pulsed_data signal in another example of a pulsed serial link according to another embodiment;

DETAILED DESCRIPTION

Figure 1:
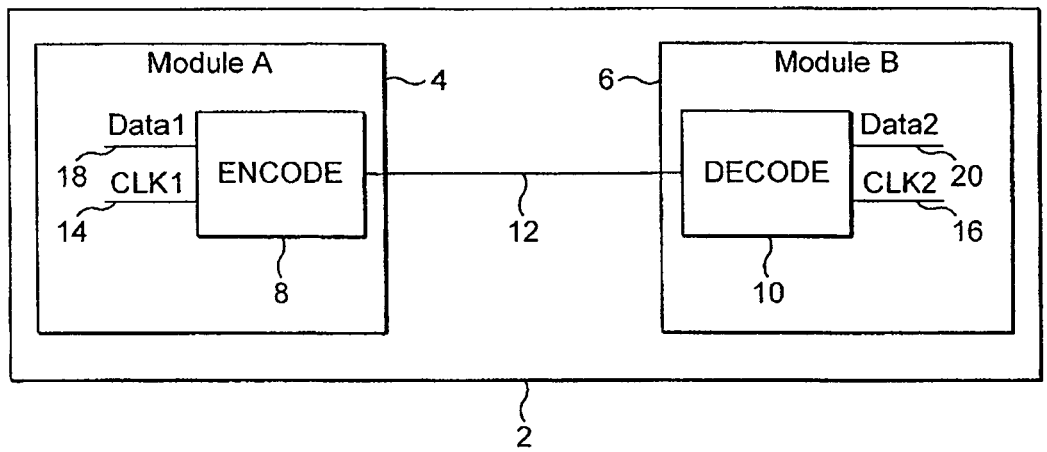
FIG. 1 is circuitry for communication between two modules on an integrated circuit in which embodiments of the present disclosure may be incorporated.

A method and apparatus synchronizing signals between clock environments will be described in relation to signals transmitted between communicating modules using a pulsed serial link, which is described in detail below. It will be apparent to those skilled in the art that the principles however may be applied to any system in which signals cross between two or more different clock environment, and in which there is a particular relationship between the clock signals as described below.

Synchronizers between clock environments can be avoided if the relationship between the two clocks is known. In this case the relationship may be described as semi-synchronous. For instance if one clock is an exact multiple of a second clock, then simple logic can be used to detect the phase relationship and subsequently to capture data correctly. There is no problem with metastability and no delay penalty. It is possible to implement a design which uses synchronizers when the clocks are asynchronous, uses a semi-synchronous technique when the clocks have a common sub-frequency, and operates purely synchronously when the two clocks are the same. Switching between these arrangements could be performed by a program running on an on-chip CPU, or by signals coming from an off-chip source. In such a situation, whenever the clocks are asynchronous, the synchronizers are required, with associated delays.

When the two clocks are derived from the same source and have the same frequency, they are not asynchronous. If the phase relationship is known, and usually balanced at the end points, then the two clocks can be described as synchronous. But when the phase relationship is unknown, then the term isochronous can be used to describe the relationship between the signals which have the same frequency.

A metastability risk is present when, for example, the clock edges of the first and second clock environments occur within a certain time period of each other, meaning that minimum setup and hold times in the circuit are not respected. In embodiments described herein below, when a signal crosses from one clock environment to another which is isochronous with respect to the first, then the synchronizer delay can be avoided. There is however a remaining metastability risk when the clocks are approximately in-phase. According to the embodiments described below, this risk can be eliminated by delaying the signal by a small amount, the amount being significantly smaller than one clock period. A phase detector is required to determine whether or not this small delay is required.

Although this phase detector itself can also be subject to metastability, it is a property of this and systems described herein that such metastability does not feed forward to affect the communication of information from one clock environment to another.

The embodiments described below have the advantages that the synchronizer delay of several clock cycles is avoided and that the implementation is independent of clock frequency.

FIG. 1 is circuitry in which data is to be transmitted between a module A, labeled 4 in FIG. 1 and module B, labeled 6 in FIG. 1, both modules being on an integrated circuit 2. As described in more detail below, synchronization circuitry is included in decode block 10. Although modules A and module B are illustrated as being on the same chip, it will readily be appreciated that the principles discussed in the following can be implemented in a number of different environments, in particular in a situation where the communicating modules are on different ICs. In prior art embodiments, a parallel bus with separate clock distributed to both modules may have been used between modules A and B in order to transmit data and time information. In such systems the clock frequency must be low enough to allow clean synchronous communication across the plurality signal wires comprising the parallel bus. In order to increase the bandwidth (number of bits of useful communication per second) of the system, the number of wires is increased. Alternatively, in typical asynchronous communications, for example in the RS232 serial port, a single wire carries the bit information which is clocked at a specified clock rate. The two clocks, one in the transmitter, and one in the receiver, are independent and asynchronous in both phase and frequency, but are both within the specified tolerance range. This asynchronous arrangement is typically further refined by continuously adjusting, adapting or locking the receive clock to closely match the characteristics of the transmit clock by inference from the edges in the received data. Nonetheless, the two clocks are independent and hence described as asynchronous.

Serial communications links have a number of problems. They have relatively high latency due to resynchronization requirements at the destination module. Bandwidth is limited due to the tolerance range specified above. In alternative serial connects where a clock is transmitted alongside data, bandwidth will also be limited by tolerances imposed because of timing variations between the signals. Serial links are also costly due the requirement of generating the necessary high speed encoding and sampling clocks. Encode and decode blocks for serial links also require complex logic, especially if analogue techniques are employed.

According to the embodiments such as the embodiment shown in FIG. 1, a single wire 12 is used between modules A and B to transmit data and timing information. In order to achieve this, a data signal DATA1 on line 18 is encoded by an encode block 8 with a clock signal CLK1 received on line 14 before being transmitted on line 12. A decode block 10 decodes the signal on line 12, to retrieve the data signal, now labeled DATA2 on line 20, and the clock signal CLK2 on line 16. According to this embodiment, CLK1 will have the same frequency as CLK2, however the phase relationship between these clocks is indeterminate.

The system of FIG. 1 can be described as GALS (globally asynchronous, locally synchronous) as will now be explained. Module A includes logic (not shown) clocked by CLK1 which generates the data signal DATA1 on line 18, and module B includes logic clocked by CLK2 which receives the data signal DATA2 on line 20. The logic in Modules A and B is synchronous in that it is clocked by CLK1 and CLK2 respectively. However, as CLK1 is not in phase with CLK2, modules A and B can be said to be asynchronous. Therefore, globally the circuit is asynchronous.

A system for encoding data and timing information onto a single connection 12 will now be described with reference to FIGS. 2 to 5. The underlying principle of the system will be described first with reference to FIG. 2.

FIG. 2 shows timing diagrams for clock signal CLK1 14, a bit_request signal 22, bit_data signal 24, a pulsed_data signal 26, and a pulse_end_n signal 28. The frequency of this clock signal is, for example 100 MHz, however clock frequencies used in other embodiments could be any clock frequency that would work given the particular environment.

Bit_request signal 22 is a common signal used in conjunction with data signals, and when this signal is high, this indicates that the data on bit_data signal 24 is valid.

The bit_data signal 24 indicates the data value whilst bit_request signal 22 is high. The bit_data value transmitted by bit_data signal 24 could be a '1' or '0', represented by a high or low signal: both possibilities are shown in FIG. 2.

According to embodiments described herein, the clock signal CLK1, bit_request and bit_data signals are all encoded into a single signal. This is shown as pulsed_data signal 26. The rising edges of pulsed_data signal 26 occur immediately following rising edges of clock signal CLK1. Therefore, the pulsed_data signal 26 is still valid as a clock signal for any sequential logic clocked by the rising edge of said pulsed_data signal. When this signal is received by module B, the clock signal may be used not only for allowing the retrieval of the encoded data (discussed later), but also for use as a local clock, after suitable buffering, in module B. The buffering delays the clock to produce CLK2 used by the logic in module B and, thus CLK2 must be treated as a separate clock from that used directly for decoding.

As shown by the example illustration of signal 26, data is encoded into the falling edge of the clock signal which can be transmitted on a single wire (line 12 in FIG. 1). This is achieved by altering the timing of the falling edge depending on the data. In the case that at the time of the first rising edge of CLK1 14, the bit_request was low, this indicates there is no valid data to send. This is indicated by the first falling edge of the pulsed_data signal 26 falling at point C, a predetermined delay $\Delta_C$ from the rising edge.

At the second rising edge of CLK1 14, bit_request signal 22 is high, indicating that there is data on bit_data signal 24. In this case, if the data is a '0', the falling edge will be at time A, a delay $\Delta_A$ from the rising edge, and if the data bit is a '1', the falling edge will be at time E, a delay $\Delta_E$ from the rising edge. In this way data is encoded onto the clock signal. In this embodiment, timing locations B and D (at respective delays $\Delta_B$, $\Delta_D$ from the rising edge) are used when decoding the encoded signal, as will be explained in more detail below.

In this example, the request and one bit of data has been encoded onto three possible positions of the falling edge of the clock signal. Thus effectively 3 input bits (clock, request and one bit of data) have been encoded onto a single wire with only 3 variations per period where normal binary logic would require 8 variations for 3 bits. However, the clock does not represent a full binary bit because it is only the rising edge that is of interest. Also, the combination of request and data does not represent two full binary bits because the data is irrelevant when there is no request. In alternative arrangements a single wire with only two or any number more than three possible positions of the falling edge of the clock signal could be used. Such alternative arrangements could be used to encode one, two, three, four or more data bits into each falling edge. Also, as described in more detail below, one or more control functions could be encoded into each falling edge. This would require more, or less, possible timing locations for the falling edge. For example, consider the pulse shown in FIG. 2A, where falling edge location A denotes 00, falling edge location B denotes 01, falling edge location C denotes a null, falling edge location D denotes 10 and falling edge location E denotes 11. It will be apparent when the encoding and decoding circuitry is described below that slight modification to this circuitry would allow a greater number of bits to be transmitted on each falling clock edge. The only limiting factor in the amount of information that can be transmitted is the accuracy of the delay circuitry delaying the falling edges, and the accuracy of the detecting circuitry for detecting the timing of the falling edges in the decode block. However, it is important to note that absolute accuracy of delay elements in encode and decode circuits is not important, only their accuracy in respect to each other.

Finally, the pulse_end_n signal 28 shown in FIG. 2 is a signal that occurs in the encode circuit during the encoding of the data and clock, and this signal will be referred to in relation to the operation of the encoding block.

There are numerous advantages with pulsed serial link described above. This is a genuine single wire connection, with clock, data and data valid encoded on one line. As described below, the encode and decode blocks can be purely digital. Bandwidth is used efficiently. High speed clocks are not required, and nor are analogue techniques. There is also no requirement for an isolated power supply. The logic required for encoding and decoding is minimal, and for higher bandwidth utilization, the amount of logic scales proportionately. Furthermore, if the clock is stopped during periods when no data is being transferred, the link is power efficient. In the circuit of FIG. 1, when CLK1 is stopped, CLK2 is also stopped and hence all of the logic in module B no longer consumes power.

Figure 3:
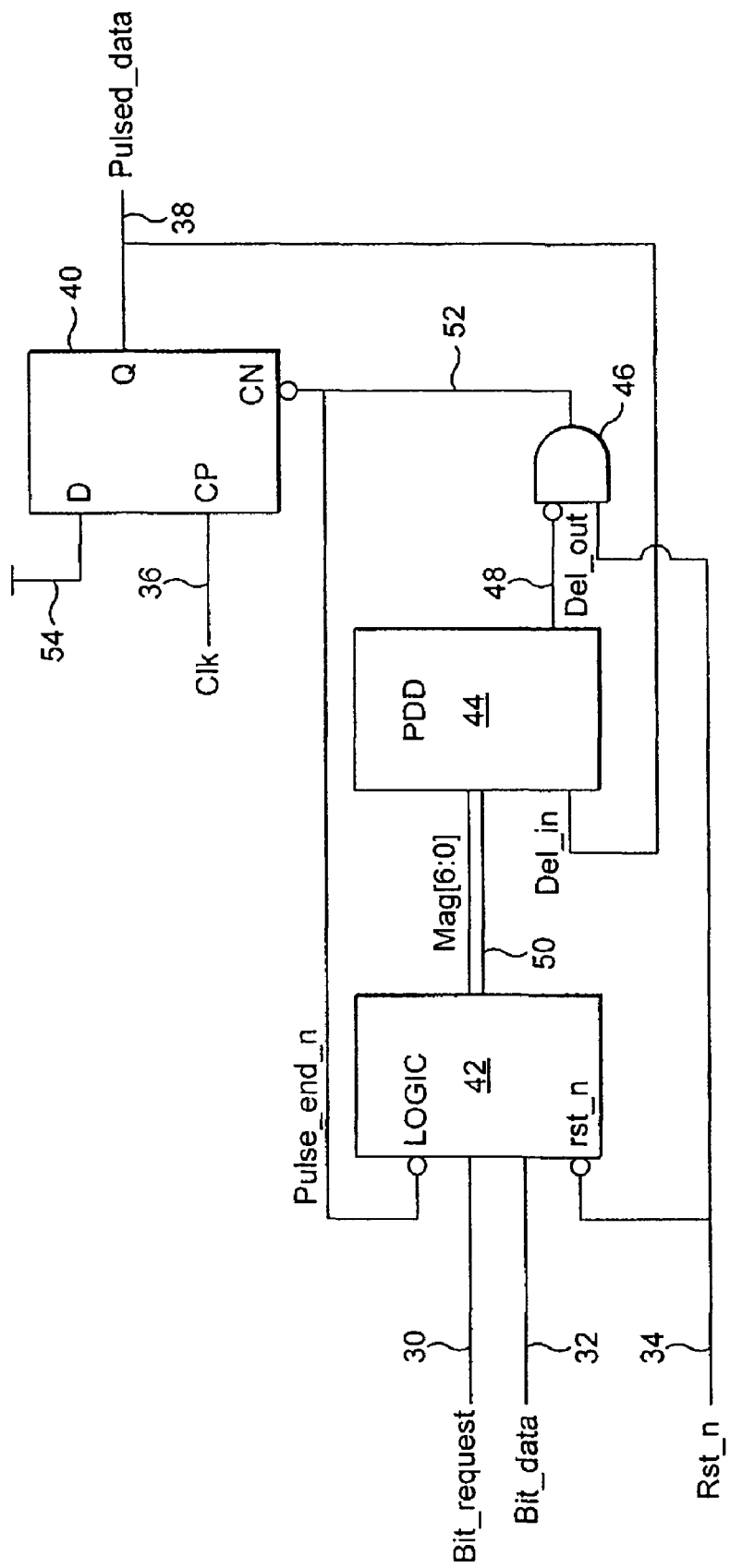
FIG. 3 illustrates encoding circuitry for encoding data in a pulsed serial link according to another embodiment.

FIG. 3 shows encode circuitry according to one embodiment. As shown in FIG. 3, the bit_request signal is provided on line 30, the bit_data signal is provided on line 32, the clock signal is provided on line 36, and a reset signal, rst_n, is provided on line 34. During normal operation of the encoder circuitry, the reset signal, rst_n, on line 34 will be high, allowing the circuit to function normally. The reset signal, rst_n, is asserted low during power up and in other situations to ensure a clean initial state across the system on chip (SoC). However, in alternative embodiments other initialization techniques could be used which do not require this form of reset signal.

The encoder circuitry comprises a D-type flip-flop 40, logic block 42, a programmable digital delay (PDD) block 44, and AND gate 46. The pulsed_data output signal 26 is provided at the output of flip-flop 40 on line 38. The signals bit_request and bit_data on lines 30 and 32 are connected to inputs of the logic block 42. The reset signal, rst_n, on line 34 and a pulse_end_n signal 52 from the output of the AND gate 46 are also connected to inputs of the logic block 42. Based on the values of bit_request and bit_data, and also the values of the rst_n signal and the pulse_end_n signal, the output of logic block 42 labeled 50 is determined.

In the present embodiment, the output of logic block 42 will be a series of control lines 50, in the form similar to a one hot encoding, which control circuitry in the PDD block 44. One hot encoding is a scheme known to those skilled in the art that allows the complexity of system design to be minimized. There are seven control lines in the embodiment shown in FIG. 3, labeled Mag(0) to Mag(6), and on each line a '0' or a '1' may be asserted, with the only legal combinations being all 0's or a continuous run of 1's across any number of Mag(0), Mag(1) through to Mag(6) respectively. For example, if Mag(4) is asserted, then lines Mag(3) to Mag(0) must also be asserted. This is a requirement of the PDD 44 described in the current embodiment, and if alternative programmable delay lines were used, then different combinations of signal might be possible.

The number of these control lines that are asserted high determines the magnitude of the delay Δ of the programmable digital delay block 44 between its input signal, del_in connected to 38 and its output signal, del_out, connected to 48. Seven control lines are provided is this embodiment, which allow reset plus seven different delay values to be selected. The first such selection, when all control lines 50 are zero, is used when in the defined initial condition for the circuit, which is when rst_n is asserted low. The second such selection, when only mag(0) is '1', is the minimum delay, used to control the width of the low going pulse of pulse_end_n on line 52, as explained in more detail below. Five of the remaining different delay values allow the five delays $\Delta_A$ to $\Delta_E$ to be selected.

The programmable digital delay block 44, which is connected to logic block 42 by connection 50, receives the magnitude control signals Mag(0) to Mag(6), and also receives the pulsed_data signal on line 38 from the flip-flop 40. The PDD 44 determines the timing of the falling edge of the pulsed_data signal on line 38. The inverted output of PDD 44 on line 48 is connected to one input of two input AND gate 46. The second input of AND gate 46 is connected to the reset signal rst_n 34. The output of AND gate 46 on line 52 is connected to a not reset input CN of D-flip flop 40, which causes an asynchronous reset of the flip-flop when line 52 is low, independent of the clock input CP 36. This output on line 52 is also connected to logic block 42.

In alternative embodiments, the magnitude of the delay through the PDD 44 may be controlled by any encoding scheme which is different from the one-hot encoding scheme described above, such as straight binary, gray-code, mixed course plus fine, or any encoding to suit the range and selection of the programmable delays required.

Logic block 42 will output low signals on all of the control lines if the reset signal on line 34 is low, irrespective of values on other inputs. If rst_n is high, and the pulse_end_n signal on line 52 is low, then according to the present embodiment, Mag(0) will be asserted high, and all the other control signals will be low, irrespective of the values of bit_request and bit_data. This will select the smallest time delay from the PDD block 44, used to control the width of the low going pulse of pulse_end_n on line 52.

If rst_n is high, pulse_end_n is high, and bit_request signal 22 on line 30 is low, then this indicates that there is no data, and control lines Mag(4), Mag(3), Mag(2), Mag(1) and Mag(0) will be asserted high by logic block 42, and the rest of this magnitude signal will be controlled to be low. This will result in a delay value being programmed in the PDD block 44 equal to delay $\Delta_C$ shown in FIG. 2. It should be noted that this delay is calculated from the rising edge of the pulsed_data signal 26.

If on the other hand the bit_request signal on line 30 is high, then the values on the control lines will depend on the data bit to be transmitted. If bit_data signal on line 32 is a '0' (low), control lines Mag(2), Mag(1) and Mag(0) will be asserted high and the rest of the control lines will be low. This would control the PDD block 44 to give a delay equal to $\Delta_A$. If the data bit is a '1' (high), then all of the control lines Mag(6) to Mag(o) will be asserted, giving the greatest possible delay. This would control the PDD block 44 to give a delay equal to $\Delta_E$.

In practice, because the delays through components 40, 42 and 46 in FIG. 3 are significant with respect to the individual delay steps of PDD 44, then the actual width of the pulsed_data high pulse will be different from the programmed delay through PDD 44. However, since the delay steps of the programmable delays in the decoder match the delays steps of PDD 44 in the encoder to an acceptable tolerance, then any implementation offset can be compensated at the design stage in either encoder or decoder.

Operation of the encoder circuitry of FIG. 3 will now be described with reference to the timing diagrams in FIG. 2. As explained above, flip-flop 40 provides the pulsed_data output on line 38. The D input to this D type flip-flop is connected to line 54, which is connected high (logic '1'). Therefore whenever the clock input on line 36 goes high, output Q of the D flip-flop will go high shortly afterwards. However, the reset input of the D type flip-flop 40 is connected to line 52. This reset input is inverted, and therefore whenever the pulse_end_n signal on line 52 goes low, the output of the flip-flop will be reset to 0. The timing of this reset determines the timing of the falling edge of the pulsed_data signal 38.

As shown in FIG. 2, shortly after the first rising edge of CLK1, the pulsed_data signal goes high. This is because the high input at the D input of flip flop 42 is clocked by CLK1, and output at the Q output of the flip flop. Note that the pulse_end_n signal on line 52 is high, and therefore the D flip flop is not being reset.

The rising edge of the pulsed_data signal will arrive at the PDD block 44, and the time delay provided by this block will be determined by the values of the control signals Mag(6) to Mag(0). These signals are provided by logic block 42, and as the reset signal, rst_n, is high and the pulse_end_n signal is high, but the bit_request signal 30 is currently low, magnitude control lines Mag(4) to Mag (0) will be asserted high, and the other lines will be low. This means that the output of a programmable digital delay block 44 will rise at time C, which is a certain delay after the rising edge of the pulsed_data signal, controlled by the programmable digital delay circuitry.

The rising edge of the delay block output on line 48 will cause the pulse_end_n signal on line 52 to go low, as the signal at the inverted input of AND gate 46 will now be high. The falling edge of the pulse_end_n signal 28 in FIG. 2, on line 52 will in turn cause the flip-flop 40 to reset, causing the pulsed_data signal fall to 0 at time C, very shortly after the delayed rising edge at the PDD output. This is shown in FIG. 2 by arrow 30.

The falling edge of pulsed_data signal on line 38 will also arrive at the input to the programmable digital delay. This time, the control signals provided by logic block 42 will be different. This is because the pulse_end_n signal is now low, and in this situation, as explained above, only Mag(0) is asserted high, and the remaining control signals are asserted low. This provides the minimum delay step through PDD 44. Therefore, following this minimum delay after the falling edge of pulsed_data, the pulse_end_n signal will return to high, releasing the asynchronous inverted clear input to flip-flop 40 again. However, it will not be until the next rising edge of clock signal 36 that the activation of the flip-flop 40 is noticed at the output. Note that a minimum delay is used for the low width of pulse_end_n 52, but if implementation analysis revealed any timing hazard, then this minimum delay could be increased by one or more steps.

On the next rising edge of CLK1, once again the pulsed_data output on line 38 will go high. This rising edge will arrive at the programmable digital delay block 44. This time reset, rst_n, and pulse_end_n are both high, and bit_request is also high. Therefore the control signals 50 will be determined by the bit_data signal on line 32.

As mentioned above, if the data bit were a '0', then control signals Mag(2) to Mag(0) would be asserted, and if the bit_data value were a '1', then control signals Mag (6) to Mag(0) would be asserted. In the case of a '0' bit, the pulse_end_n signal will fall at time A. This would then reset the D flip-flop 40 and cause the pulsed_data output 38 to drop shortly after point A. The falling edge of the pulse_end_n signal on line 52 would cause logic 42 to then assert only control signal Mag (0), providing the minimum delay until the pulse_end_n signal rises again.

Alternatively, if the data bit on line 32 were a '1' then the pulse_end_n signal would fall at time E, causing the D flip-flop 40 to reset and pulsed_data signal 38 to fall. Again, the falling edge of the pulse_end_n signal on line 52 will cause logic 42 to assert only the control signal Mag(0), meaning that the pulse_end_n signal will rise again after the minimum delay step.

PDD 44 is used to control the high width of pulsed_data via bit_request 30 and bit_data 32, and is also used to control the low width of pulse_end_n 52. It is important that this minimum width of pulse_end_n low is controlled in order to avoid asynchronous timing problems which could be induced if pulse_end_n 52 was allowed to merely to glitch low. A minimum delay value is used here, rather than no delay at all, as if implementation analysis reveals any timing hazard, the minimum delay may be increased by one or more steps.

Another subtlety of this design is the property that pulse_end_n input to 42 causes the designated minimum delay code to be set on 50. The design of the PDD 44 is such that all 1's which may be residual in the PDD, as a consequence of a long pulsed_data high pulse width to encode a requested bit_data value of 1, are cleared by the selection of this minimum delay. This means that the next rising clock edge on 36 can occur shortly after the minimum delay following the latest falling edge of pulsed_data. If this were not the case then the next clock edge could not safely occur until after pulsed_data had been low for the maximum delay.

Figure 5:
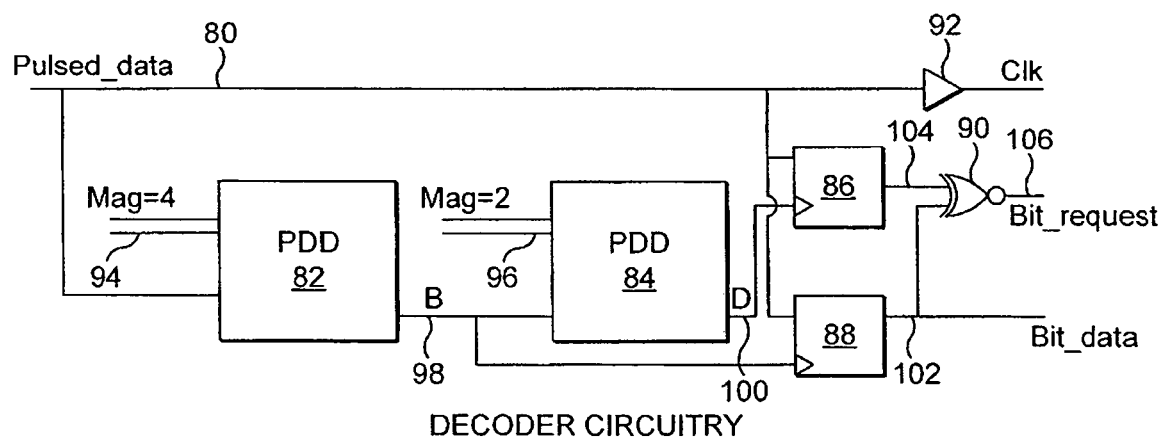
FIG. 5 illustrates decoding circuitry for decoding data and timing signals from the encoded signal of FIG. 3.

The pulsed_data signal on line 38 will be transmitted via line 12 to module B, where it will be decoded by a decode block 10. Decoding of the pulsed_data signal will now be described with reference to FIGS. 4 and 5. FIG. 5 shows decoder circuitry. Two programmable digital delay blocks are provided labelled 82 and 84. The output of the programmable digital delay block 82 is connected to the clock input of a first D flip-flop 88. The output of the second programmable digital delay block 84 is connected to the clock input of a second D flip-flop 86. The pulsed_data signal is input on line 80 and provided to the input of the PDD block 82. The output of PDD 82 is provided to the input of the PDD 84. Alternative arrangements might implement a single digital delay, which does not need to be programmable, but provides output taps equivalent to magnitudes 4 and 6 respectively.

The output of D flip-flop 88 provides the bit_data signal. The output of the flip-flop 86 on line 104 is connected to one input of a two input exclusive NOR gate 90. The second input of the exclusive NOR gate 90 is connected to the output of flip-flop 88. The output of exclusive NOR gate 90 on line 106 provides the bit_request signal.

The clock is also retrieved from the pulsed_data signal having been passed through a Buffer 92. As described above, the clock is preferably used to clock logic in the destination module. A clock tree would be used to distribute the clock to this logic, and Buffer 92 is provided to drive the clock tree loading. A greater number of buffers may be required for this purpose. It should be noted that there may be a significant delay, possibly more than one period of the clock, in propagating the clock through such a clock tree.

Figure 4:
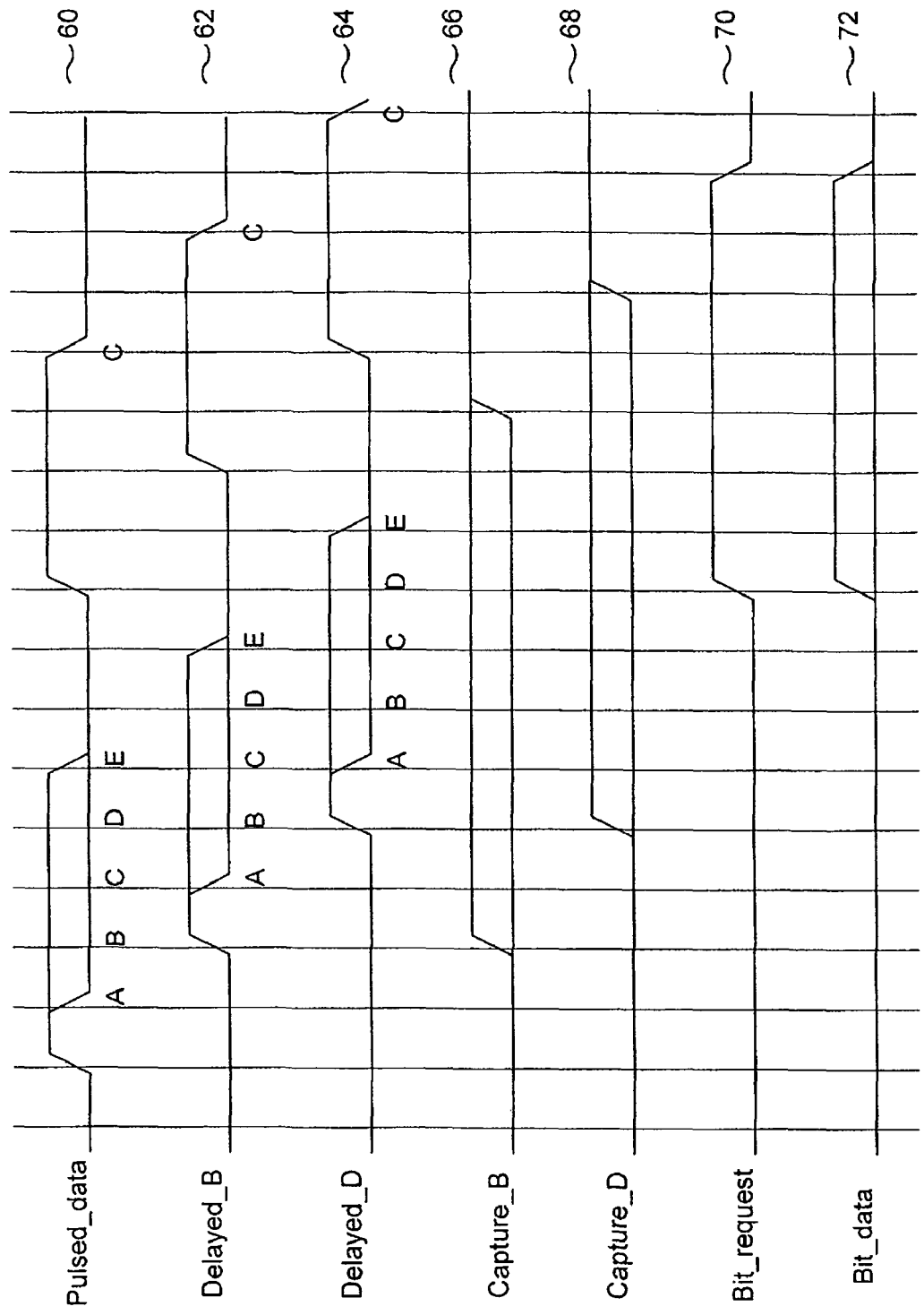
FIG. 4 illustrates data and timing signals recovered from the encoded signal of FIG. 3.

The programmable digital delay blocks 82 and 84 provide measuring gauges in order to determine the timing of the pulsed_data signal. The output of a first delay block 82 is at time B. Signal 62 shown in FIG. 4 illustrates the signal on line 98 output of PDD block 82. As shown by signal 62, the rising edge of this signal is aligned with position B of the pulsed_data signal. In order to provide this delay, control lines Mag (6) to Mag(0) are used to control delay elements in the PDD blocks 82 and 84 in a similar fashion to the previous example. However, in the PDD 82 and 84, the values on the control lines to each PDD 82 and 84 will usually be fixed so that the delay selection provided by these blocks remains constant.

In order to give a delay at time B, control signals Mag(3) to Mag(0) will be asserted high, and the remaining control signal asserted low. The output of the PDD block 82, delayed to time B, is provided to the PDD block 84. PDD block 84 outputs the pulsed_data signal after a delay to time D. Control signals Mag (1) to Mag (0) are asserted on lines 96 at the input to PDD 84 in order for PDD 84 to have the required delay.

As explained above, the pulsed_data signal, as shown in FIGS. 2 and 4, has three possible positions of the falling edge at times A, C, or E. The pulsed_data signal will arrive on line 80 of the decode block shown in FIG. 5. Consider sampling the pulsed_data at positions B and D respectively. If the values sampled at B and D are both low, then the falling edge must be at position A. If the values sampled at B and D are high and low respectively, then the falling edge must be at position C. If the values sampled at B and D are both high, then the falling edge must be at position E.

According to the encoder, described above, position A represents a valid data bit 0, position C represents no valid data, and position E represents a valid data bit 1. It can be seen that for valid data, sampled values at B and D are either both high, or both low; and if both values at B and D are high or low, the data value can be extracted by looking at either sample. In the embodiment shown in FIG. 5 the sampled value at B is used to extract the data bit. When there is no valid data, then the values sampled at B and D are different, being high and low respectively; hence the data valid signal bit_request can be extracted by the logical exclusive NOR function. Alternatives allow such logic extraction to be automatically optimized and could implement any Boolean equivalent. Again, alternatives of the sampling points and Boolean logic would allow for alternative numbers of falling edge positions, numbers of bits encoded and alternative coding schemes.

In the preferred arrangement, the sampling mechanism to capture the value at position B is to clock the value of the pulsed_data 80 at the D input of flip-flop 88, using a clock edge at position B. The clock edge is simply created by delaying the pulsed_data 80 by passing it through PDD 82 with appropriate settings on its magnitude inputs 94. The output of flip-flop 88 on line 102 is the value sampled at position B. This signal, is shown in FIG. 4 labeled Capture_B 66. Likewise, the sampling mechanism to capture the value at position D is to clock the value of the pulsed_data 80 at the D input of flip-flop 86, using a clock edge at position D. This clock edge is created by further delaying the delayed_B 98 by passing it through PDD 84 with appropriate settings on its magnitude inputs 96. The output of flip-flop 86 on line 104 is the value sampled at position D. This signal is shown in FIG. 4 labeled capture_D 68. The extracted bit_request 106 is the output of the exclusive-NOR gate 90, with inputs capture_B on line 102 and capture_D on line 104. The capture_B output from flip-flop 88 on line 102 is the extracted bit_data signal, shown as signal 72 in FIG. 4.

As described previously, the programmable delay lines in the encode and decode blocks are preferably programmable digital delay blocks. A programmable digital delay blocks will now be described with reference to FIG. 6.

Figure 6:
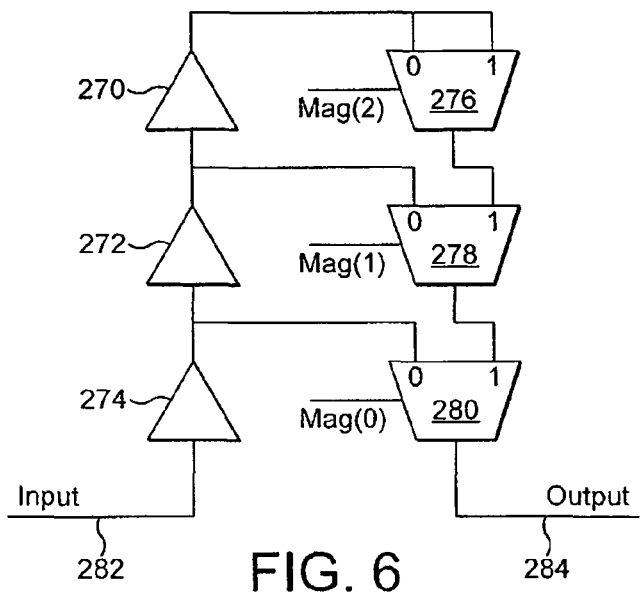
FIG. 6 illustrates one possible embodiment of a programmable digital delay line.

FIG. 6 shows a programmable digital delay line in which the input to the delay line on line 282 is connected to a number of delay elements 270, 272, 274 which are connected in series. Three multiplexers are provided, which are labeled 276, 278, 280. Each multiplexer has two inputs, labeled '0' and '1'. If the control signal to a multiplexer is a '0', the '0' input will be selected. If the control signal is a '1', the '1' input will be selected.

The '0' input of each of the multiplexers 270 to 274 is connected to a different point on the delay line. For example, the '0' input to multiplexer 280 is connected to the output of delay element 274. In the case of the last multiplexer in the line, which in this case is multiplexer 276, both of its two inputs are connected to the output from the last delay element in the line, delay element 270. The second input to each of the other multiplexers in the circuit is connected to the output of the previous multiplexer. For example, the '1' input to multiplexer 278 is connected to the output of multiplexer 276. The '1' input to multiplexer 280 is connected to the output of multiplexer 278. In this circuit, the output of multiplexer 280 on line 284 provides the output of the delay line.

Operation of this delay line circuit is as follows. Each of the multiplexers 276 to 280 has a control input, and these are labeled Mag(2) to Mag(0) respectively. If multiplexer 280 is controlled to output the signal received at its '0' input, the signal of the output of delay element 274 will be selected for output. In this case the overall delay at the output 284 would be equal to the delay of delay element 274, and the delay added by multiplexer 180. If however, multiplexer 280 is controlled to output the input received at its '1' input, and multiplexer 278 is controlled to output the input received at its '0' input, the signal at the output of delay element 272 will be connected via multiplexers 278 and 280 to the output 284. In this case, the total delay to the input signal present at the output on line 284 would be equal to the delay added by delay elements 274 and 272 and the delays added by the multiplexers 278 and 280. This will always be greater than the delay when only one delay element is selected. Thus in this circuit, monotonicity is always maintained, as the more delay elements that are selected, the greater the delay at the output.

It will be obvious to those skilled in the art that although only three delay elements and three multiplexers have been shown in this circuit for clarity, in practice the number of delay elements and multiplexers could be any required number, for example 500 or more. These would be provided in the series, connected in a similar fashion to delay 272 and multiplexer 278.

The minimum selectable delay in the circuit of FIG. 6 will be when only delay element 274 and multiplexer 280 are selected. If delay element 274 is a very small delay, then this smallest delay can be a lot smaller than smallest delay selected by the multiplexer tree.

Another advantage of the circuit layout in FIG. 6 is that the delay line may be positioned relatively freely on the chip in whatever layout is required by the chip designer. The delay elements and multiplexers could be arranged in one long line, or alternatively they could be arranged in a zig-zag. In either case, the performance of the delay line would not be affected.

Depending on available chip area for encode and decode blocks, and the required bandwidth, different numbers of selectable pulse widths can be used to encode the data onto the serial connection. For lower bandwidth requirements, then two selectable pulse widths can be used to carry simple binary data. The bandwidth efficiency is essentially one bit of data per clock period, minus any serial protocol overheads. The encoding and decoding of the pulsed serial link with only two selectable pulse widths can be achieved with only a handful of gates.

For higher bandwidths, then a large number of pulse widths can be used. Additional steps need to be taken to ensure that the resolution between successive pulse widths can be both accurately encoded and accurately decoded. This may been the addition of calibration techniques or other sophistications. With a larger number of pulse widths, then more logic is required to store and transform the information in both encoder and decoder. There is a straight forward cost performance trade-off. Applications requiring higher performance will need larger encoders and decoders and will therefore cost more.

Whatever the number of selectable pulse widths chosen for the connection, flow control is beneficial in order to ensure that data is transmitted and received correctly. Flow control circuits and methods will now be described with reference to FIGS. 8 to 14.

As described above with reference to FIG. 2, a bit_request signal can be used to indicate when data is valid. In the scheme proposed above, this information is encoded onto the pulsed serial link by using pulse width 'C' when data is not valid, and pulses widths 'A' and 'E' for data at all other times. In this system it is assumed that the receiver is always able to receive data, and therefore no acknowledgement signal is required. However, in situations, such as those described below, in which the receive module comprises an input buffer with limited memory in which received data bytes are stored, some flow control will be necessary.

In most situations where data is to be transferred from one module or circuit to another, a handshake of some type will be required. This is to ensure that when data is transferred, both modules are in agreement that the data is being transferred. If the transmit and receive modules are synchronous, the handshake protocol between the modules is generally known as a request-grant protocol. In such synchronous systems a common clock controls the timing of data being transmitted between the modules. It is however necessary that both modules agree that data may be transmitted, and therefore a request signal is transmitted from the transmit module to indicate that there is data to be transmitted, and the receive module responds with a grant signal indicating that the data can be sent.

In asynchronous systems, in which the transmit and receive modules are controlled by different clocks, the handshake protocol between the modules is generally referred to as a valid-ack protocol. In this case, some circuitry will be required in each module to retime data signals and the handshake signals to the clock environment receiving the signal. According to the valid-ack protocol, a valid signal is transmitted from the transmit module to the receive module to indicate that data is ready to be transmitted, or is being transmitted. Either before or after the data is transmitted, an acknowledgement signal is sent back to the transmit module from the receive module, indicating in the former case that the receive module is ready to receive data, or in the latter case that data has been received, and that the receive module is ready for more data.

Flow control in the pulsed serial link as described below operates differently from these handshake protocols, as flow control signals may be encoded into the data transmitted on the pulsed serial link. It is still necessary that both the transmit module and receive modules are in agreement before data is transmitted, to ensure that input buffers in these modules do not overflow. According to the coding schemes described below, valid information is conveyed by transmitting an idle pulse when data is not valid or alternatively a data size code preceding the data to indicate that valid data will follow. An acknowledgement signal is transmitted via a return path from the receiving module back to the transmitting module, and as described below, the return path is also a pulsed serial link connection and the acknowledgement can be encoded onto the return path in a number of ways.

Figure 7:
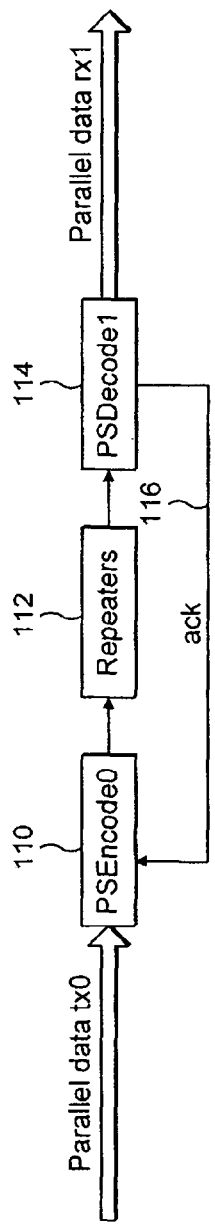
FIG. 7 illustrates a communications link with acknowledgement return path.

FIG. 7 shows a communications link which communicates using the pulse serial link connection described hereinabove. Parallel data arrives at a pulse serial encode block 110 and is encoded onto a single line as described above. This data is then transmitted to the pulse serial decode block in a second module, labeled 114, via a number of repeaters in block 112. The output from the decode block 114 is parallel data. As shown in FIG. 7, an acknowledgement line 116 is provided between the decode block 114 and the encode block 110 such that an acknowledgement signal can be transmitted when the data has been correctly received.

Using an extra connecting wire for the return acknowledge path results in poor use of available bandwidth per connection and greatly reduces the benefit gained by the single serial pulse link. In many applications, information flows in both directions, such as traditional memory read operations, where the address from where the requested data is located is sent to the memory, and the data contents at that address location are returned. So for a bidirectional data link, the ack's can be encoded into the data stream in the reverse direction.

Figure 8:
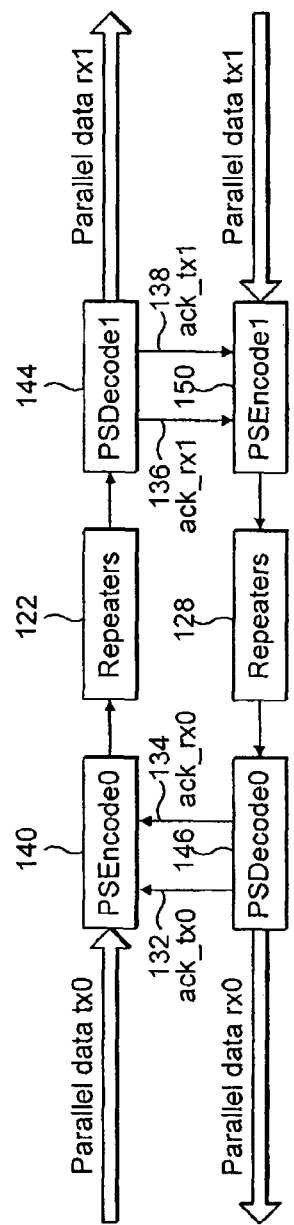
FIG. 8 illustrates a communications link with encoded acknowledgement signals according to an embodiment of the present disclosure.

FIG. 8 shows a communications link using the pulse serial connection as described above, in which acknowledgement signals are sent down the same lines as the data. As shown in FIG. 8, a bidirectional link is implemented in this example, in which outward data is encoded by encode block 140, and transmitted to decode block 144 in the receive module via repeaters 122. The receive module encodes return data in block 150, and transmits this back to the first module via repeaters 128 where the data is decoded by the decode block 146.

The decode block 144 in the receive module acknowledges receipt of the transmitted data by asserting an acknowledgement signal ack_tx1 on line 138 and this signal is then encoded by encode block 150 to be returned to the transmitting module. This acknowledgement signal transmitted from the receive module back to the transmitting module is received by decode block 146 and forwarded to encode block 140 of the transmitting module on line 134. This confirms to encode block 140 that the data was successfully received.

In a similar fashion the decode block 146 of the transmitting module acknowledges receipt of returned data from the receive module by asserting a signal on line 132 which is then encoded by encode block 140 and transmitted to the receive module. The acknowledgement signal from the transmitting module to the receive module is received by the decode block 144 and forwarded to the encode block 150 on line 136 such that encode block 150 knows that the return data was successfully received by the transmitting module.

In each case, the acknowledgement signal is sent when data has been received by decode block 144 or 146, provided that the input buffers (not shown in Figures) in these blocks are not full. Data is emptied from these input buffers in the decode blocks for output on the parallel data lines under the control of processors in the receive or transmit modules. For example, data received in the input buffer of decode block 144 is output on the parallel connection labeled parallel data rx1 under control of a processor in the receive module. The input buffer in block 144 may for example have memory to store three bytes of data, and provided there is room in the buffer to receive at least one more byte of data, the acknowledgement signal is generated and returned to encode block 140 indicating that the last byte has been received, and that the buffer is ready to receive more data. If however there is less than one byte of free memory in the receive buffer, the acknowledgement signal will not be sent, and no more data will be sent from encode unit 140 until the receive module has emptied data from the receive buffer.

Although the example of one byte of data is given, in alternative embodiments more or less data may be received before an acknowledgement is generated. In slightly different embodiments, the acknowledgement is generated by the logic that empties the data from the input buffer. This logic indicates when it is ready to receive more data by generating the acknowledgement.

One acknowledgement signal is required for every byte of data transmitted and this data is represented by one or more pulses on the pulsed serial link. In alternative embodiments, an acknowledgement may be required more or less often. Also, according to the present embodiment in which the input buffers in the decode blocks may store three bytes of data, three bytes of data may be sent before any acknowledgement is sent. However, once three bytes of data have been transmitted, only one byte may be transmitted for every acknowledgement received, to prevent overflow of the input buffer. In alternative arrangements, acknowledgements could be sent in advance of data. For example, three acknowledgements could be transmitted prior to data being transmitted, indicating to the transmit module that three bytes of data may be sent. Further acknowledgements would then be sent once more room is available in the input buffer of the receive module.

For applications that do not require any return data, implementing the return ack path over a separate return pulsed serial link has several advantages:

- The same logic and implementation is used for unidirectional and bidirectional applications. This saves on development time and ensures that a common approach is used.
- All of the system level considerations are the same for both unidirectional and bidirectional. The design of routing logic, switches, repeaters and anything else is the same.
- The return path carries all of the advantages of a pulsed serial link, especially the relationship between the ack and an appropriate clock.
- Where necessary, the logic of the return path pulsed serial encode and decode can be thinned out so as to only carry the acknowledgement.

One problem with the arrangement described above is the relationship between the acknowledgments and the clock of the block to which they are directed. The concept of the pulsed serial link works very well for data that is passed down a link, possibly through several repeaters. It is a key property of the pulsed serial link that the clock is carried on the same single wire as the data. It does not matter how much delay there is in the path, wherever the pulsed link ends up, the relationship between clock and data is well defined. In particular it should be noted that the receiver (PSDecode1) and the received parallel data (rxl) are clocked by the positive edges of the received pulse stream. This means that the transmitter (PSEncode0) and receiver (PSDecode0) at the same end of a bi-directional pulsed serial link are clocked by different clocks. Therefore, the signals shown to be crossing between these blocks (ack_tx0, ack_rx0) are passed between different, asynchronous, clock environments and potentially cause metastability problems, as discussed in co-pending U.S. patent application Ser. No. 10/816,799. One solution would be to change each of the signals which cross clock environments into a double handshake protocol and use an appropriate number of synchronization flip-flops, as will now be explained with reference to FIG. 9.

Figure 9:
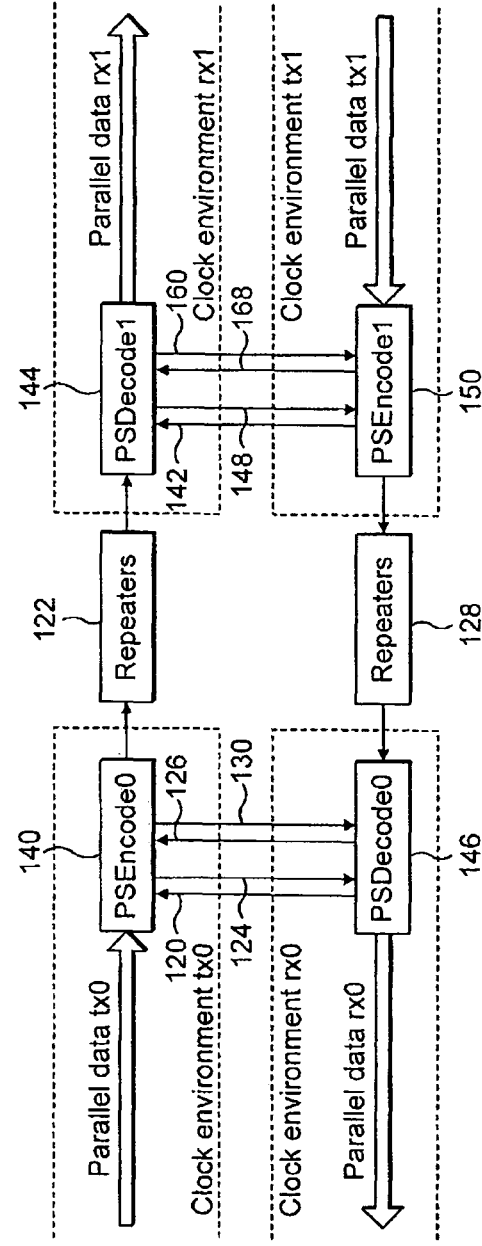
FIG. 9 illustrates a communications link using a valid-ack protocol according to another embodiment of the present disclosure.

FIG. 9 shows communication link circuitry in which a double handshake protocol is implemented between the pulse serial decode and encode blocks in the receiving module and transmitting module. Although in this example a double handshake protocol is used, in alternative embodiments any suitable handshake protocol could be used to ensure correct transmission of the data.

As shown in FIG. 9, each of the encode and decode blocks 140, 144, 146 and 150 are in different clock environments. It is therefore necessary that acknowledgement signals cross clock boundaries. To avoid metastability issues, a double handshake protocol is proposed, as depicted by the pairs of arrows between encode block 140 and decode block 146, and decode block 144 and encode block 150. In the place of each acknowledgement signal as shown in FIG. 8, two lines are now provided for sending the acknowledgement data. For example, in place of acknowledge line 132, lines 120 and 124 are now provided for transmitting the acknowledgment signal between these blocks. Each of these lines is connected to a synchronizer so that the timing of the signal is resynchronized to the correct clock environment. For example, line 120 is connected to a synchronizer in encode block 140 such that the signal is retimed from the clock environment rx0 to tx0. Synchronizers are known in the art, and generally comprise one or more flip-flops clocked by the clock of the circuit receiving the signal.

According to the double handshake protocol, when data, in this case the acknowledgement signal, is ready to be transmitted from one of the decode units, a handover signal is asserted on the line going to the associated encode unit. For example, when decode unit 144 has received a block of data and is ready to transmit an acknowledgement signal, a handover signal, for example a logic '1', is first asserted on line 160 to encode block 150. In some handshake protocols the handover signal would indicate that data is ready to be transmitted. However, in the present case the data is a 1-bit acknowledgement signal, and therefore the handover signal itself effectively communicates this acknowledgement.

When encode block 150 has received the handover signal, it responds by generating a shakeback signal, indicating that the acknowledgement signal has been received. This is done by asserting logic '1' on the return path to decode unit 144 on line 168.

This protocol is a "double" handshake because the handover signal remains high until the shakeback signal is asserted, and then the handover signal falls followed by fall of the shakeback signal. Thus there are four edges in total for each single transfer of an acknowledgement. Once the protocol has been completed, the acknowledge signal can then be encoded by encode block 150 onto the pulsed serial link, and forwarded from decode unit 146 to encode unit 140 in a similar fashion.

In alternative embodiments a different protocol could be used, for example a single-handshake equivalent where the rising edges of the handover and shakeback signals indicate one acknowledgment transfer and the falling edges of the handover and shakeback signals indicate a second acknowledgement transfer. The logic for such a protocol is more complex however the turnaround time is halved.

Figure 10:
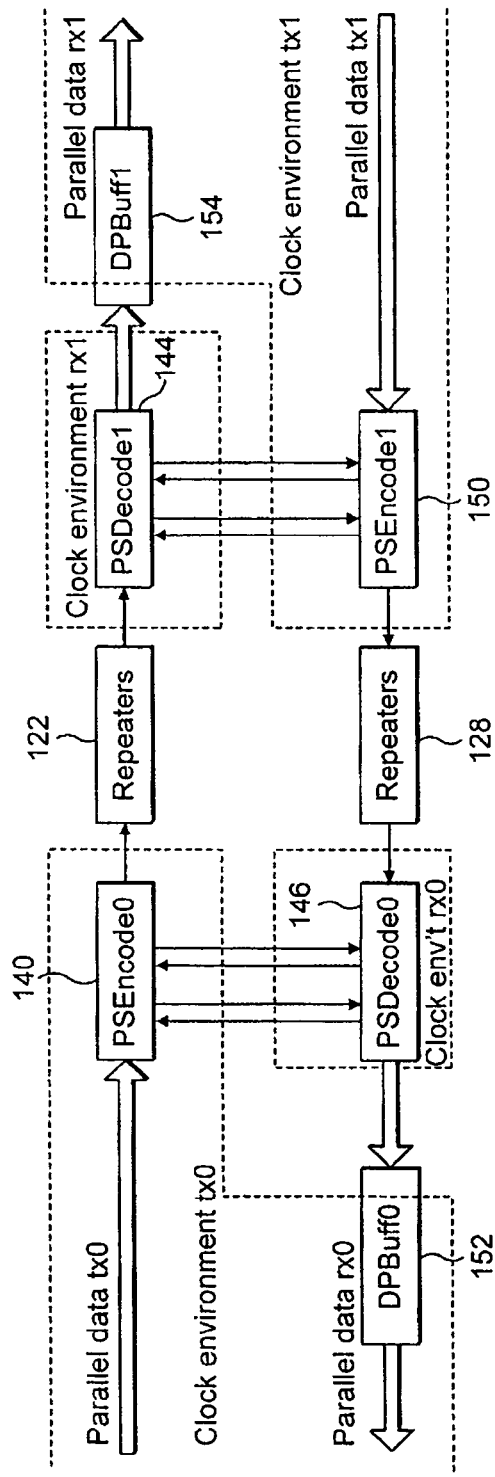
FIG. 10 illustrates a communications link including dual port buffers in which embodiments of the present disclosure can be incorporated.

In order for the parallel data signals decoded by decode block 144 and 146 in FIG. 9 to be used by circuitry in the transmit and receive modules, this data will need to be retimed to the clock environment of the transmitting or receiving module that wishes to use the data. For this dual port buffers may be used. These are illustrated in FIG. 10, labelled 152 and 154. However, as described in more detail below, by incorporating an embodiment within the decode blocks 144 and 146, then the need for retiming the data is obviated and dual port buffers 152 and 154 are not required.

Figure 14:
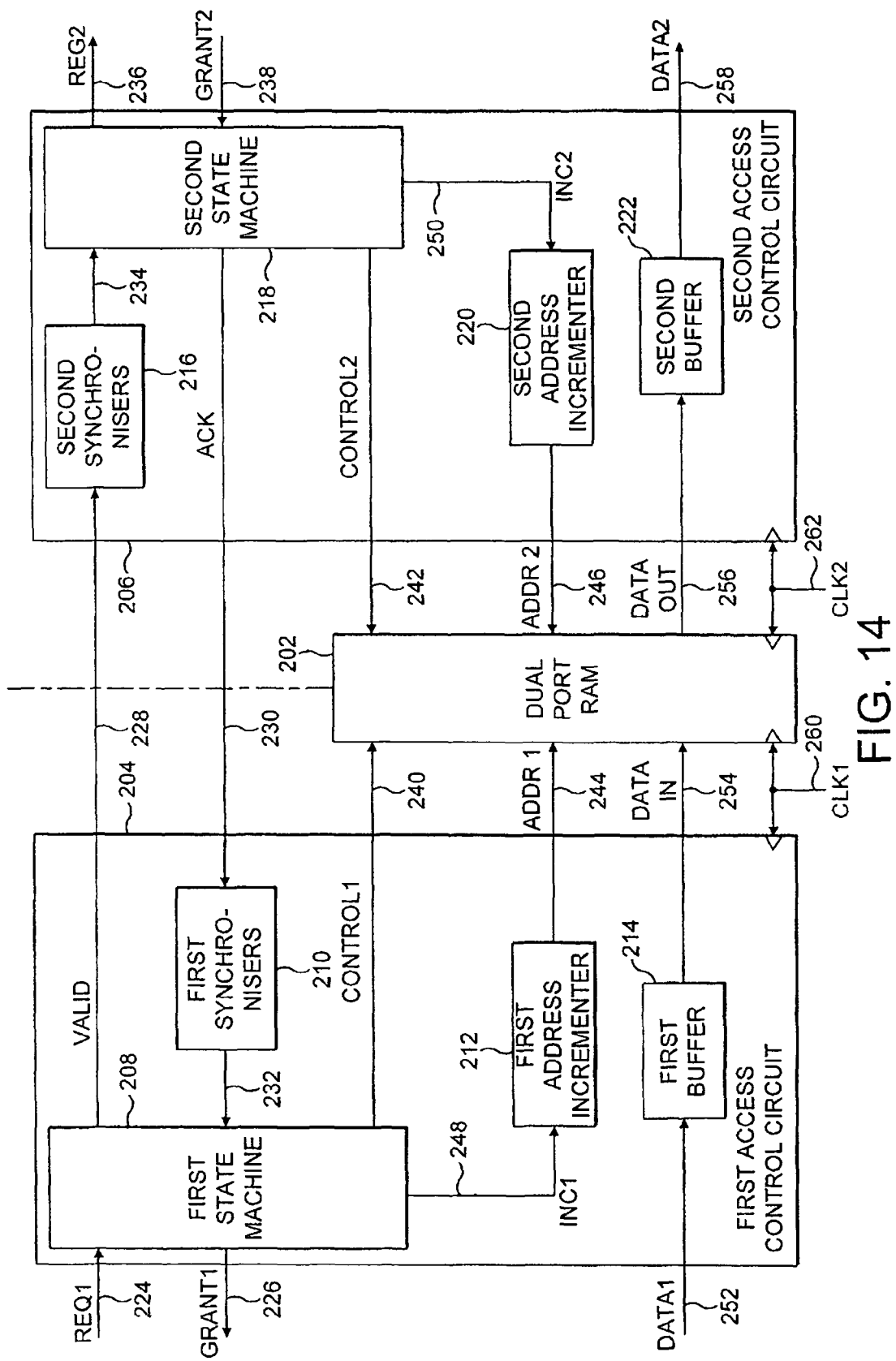
FIG. 14 illustrates a dual port buffer that can be implemented.

FIG. 14 shows dual port buffer circuitry that could be used between the PS decode blocks and the rest of the receive and transmit modules as shown in FIG. 10. The dual port buffer includes a dual port RAM 202, a first access control circuit 204 and a second access control circuit 206. The first access control circuit 204 comprises a first state machine 208, first synchronizers 210, a first address incrementer 212 and a first buffer 214. The second access control circuit 206 comprises second synchronizers 216, a second state machine 218, and a second address incrementer 220 and a second buffer 222. The first access control circuit 204 operates in the timing environment of the decode block, for example rxl in FIG. 10. The clock 1 input on line 260 will be the clock derived from the pulse serial signal received from a transmit module. The decoded data from decode block 144 is received on line 252.

The input data, labeled DATA1 may pass through the optional buffer 214 for the purpose of boosting the electrical drive of the signal for retiming under the control of clock signal CLK1. The first buffer 214 outputs the data on line 254 and also receives from the decode block a control signal REQ1 on line 224 which the decode block outputs to indicate that there is valid data to be transferred to the second timing environment.

The signal REQ1 forms an input to the first state machine 208. In response to the signal REQ1, the first state machine 208 controls the transfer of the data DATA1 into the dual port RAM 202. The first state machine 208 outputs a signal INC1 on line 248 to the first address incrementer 212, and the first address incrementer increments the address value ADDR1 on bus 44 to the dual port RAM. In this embodiment data to be transferred is stored in successive memory locations of the dual port RAM, such that for each block of data which is stored in the dual port RAM the first address incrementer 212 increments the storage address by one block. Thus, initially, the address to which the first address incrementer directs the data to be stored is an initial or base address. The first state machine 208 also outputs on bus 240 transmit control signals CONTROL1 to control the loading of the data into the selected address. Thus, under the control of the clock signal, CLK1, the data DATAIN on bus 54 of the output of the first buffer is loaded into the dual port RAM at the selected address.

Once the data to be transferred has been successfully loaded into the dual port RAM, the first state machine 208 outputs a signal GRANT1 on line 226 back to the source, thereby indicating to the source that the source may begin to send a further block of data on the DATA1 bus 52. Furthermore, when sufficient data has been loaded into the dual port RAM 202, the first state machine 208 sends a signal VALID on line 28 across the clock boundary to the second access control circuit 206.

The signal VALID on line 228 is received by the second synchronizers 216 of the second access control circuit 206, and the synchronized output of the second synchronizers 16, being the signal VALID synchronized to the second clock signal CLK2, forms an input to the second state machine 218. In response to the synchronized signal VALID the second state machine 218 outputs control signals on the second control bus CONTROL2 242 to the dual port RAM 202, and outputs a signal-INC2 on line 250 to the second address incrementer 220. This process is repeated according to how much data was transferred. Thus, the second state machine 218 controls the access of a data block stored in the dual port RAM at a location identified by the address ADDR2 on the address bus 46 output from the second address incrementer. As with the first address incrementer 212, in this-preferred embodiment the second address incrementer, in its initial state, retrieves data blocks from a base address, and thereafter from successive address locations. Thus, the second address incrementer follows the first address incrementer such that data is first retrieved from the block to which data has first been written, and so on through successive memory access cycles. Thus the data block which has been stored in the dual port RAM by the first access control circuit 204 is output as DATAOUT on the data bus 256 and stored in the second buffer 22 under the control of the clock signal CLK2 on line 262.

Once the data block has been successfully retrieved from the dual port RAM 202, the second state machine 218 sets a signal ACK on line 230 which is transferred to the first timing environment and the first access control circuit 204. The signal ACK is received by the first synchronizers 10, and the synchronized output thereof is input on line 232 to the first state machine 208. When the first state machine 208 receives the synchronized signal ACK on line 232 it indicates that there is further space in the dual port RAM for the first access control circuit to load data into.

The second state machine 218 also outputs a signal REQ2 on line 236 to a destination circuit which the data is to be transferred to in the second timing environment, when the data block has been successfully accessed from the dual port RAM 202. This signal indicates that valid data is available on the data bus 258 on the output of the second buffer 222. When the destination circuit receives the signal REQ2 it loads therein the data DATA2 on the bus 258 and once this is done returns a signal GRANT2 on line 238 to the second state machine 218, in response to which the second state machine 218 can, if further data blocks are available in the dual port RAM 202, access these data blocks and forward them to the destination circuit.

In the embodiment of FIG. 14, it is shown that the control protocol between the two timing environments is a single signal VALID in one direction from the first-timing environment to the second timing environment, and a single signal ACK in the other direction from the second timing environment to the first timing environment. However, the particular protocol that is used to control the flow of data across the timing boundary may vary considerably according to the desired application, the volume of flow of data, and the relative speeds of the two clocks of the respective timing environment. For instance, if the clock signal CLK2 in the second timing environment was much faster than the clock signal CLK1 in the first timing environment, then it is possible that the return signal of the protocol described with reference to FIG. 14, i.e. the signal ACK on line 230, could be dispensed with. However, to successfully operate such a system where there would be a single flow control signal in one direction only, i.e. the signal VALID on line 228, it would be necessary to know that the dual port buffer was going to be used in an environment where the two clocks had significantly different speeds.

If now the functions of the dual port buffer (DPBuff0) and decoder (PSDecode0) are merged (to become PSDecode2), and the extraction and insertion of acknowledgement is moved until after the clock boundary crossing, then the communication of ack information between the transmitter (PSEncode0) and the transmit clocked side of the receiver (PSDecode2) can be achieved in a purely synchronous manner. This is shown in FIG. 11.

Figure 11:
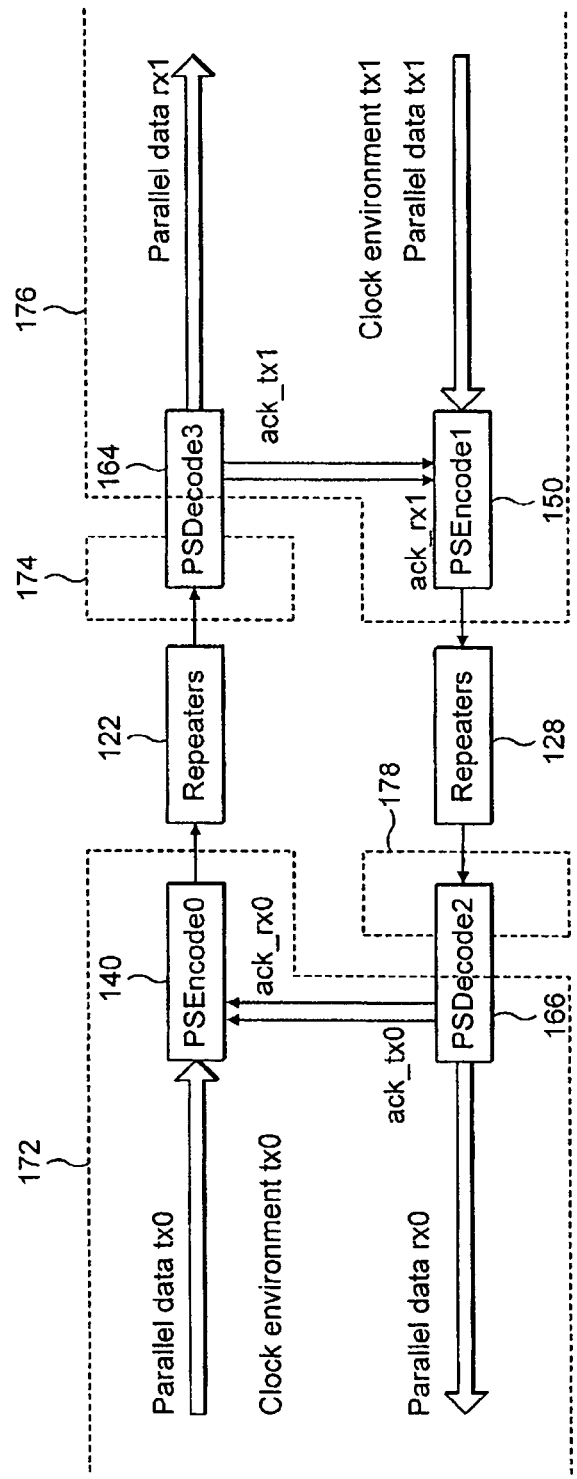
FIG. 11 illustrates a communications link in which embodiments of the present disclosure can be incorporated.

FIG. 11 shows communication link circuitry in which the decode blocks are combined with dual port buffers, such that part of the decode block is clocked by the clock received from the serial link, and part of the decode block is clocked by the clock of the received module. This circuit is advantageous as transmitting the acknowledgement signal to the transmit module can be performed after the dual port buffer circuit, for example once data has been successfully received by the second access control circuit 206 of FIG. 14. In this arrangement, because the acknowledge signal is timed by the receive module which also times the encode block 150, the valid-ack handshake protocol is not required between the decode and encode blocks. This reduces the number of connections required between these block to just two.

Figure 12:
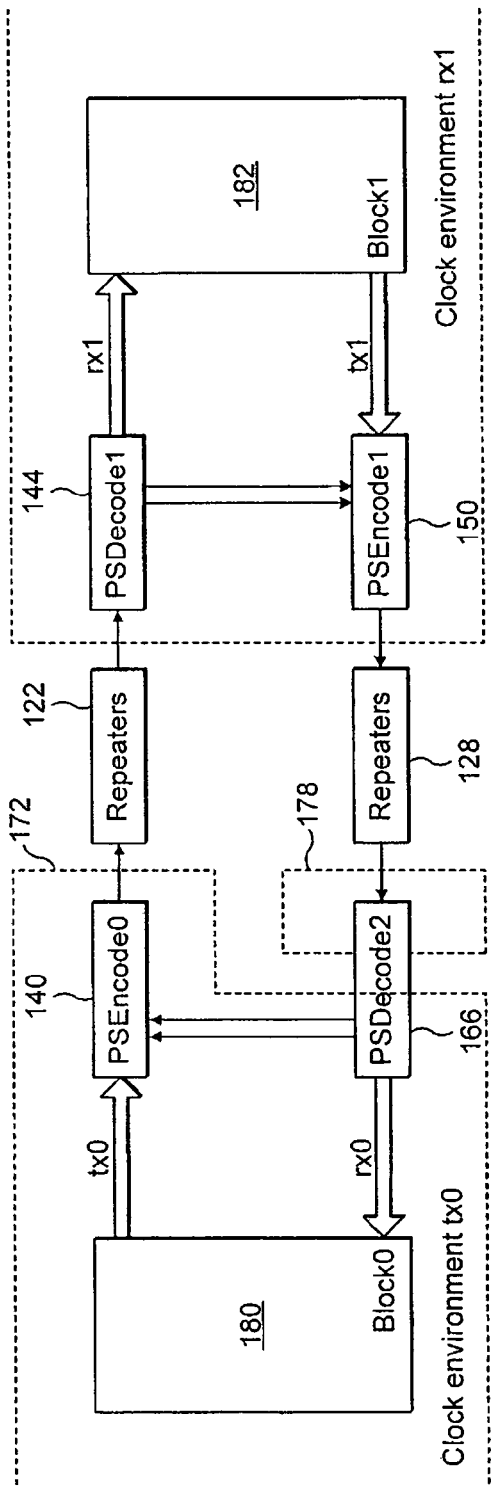
FIG. 12 illustrates a communications link according to one embodiment of the present disclosure.
Figure 13:
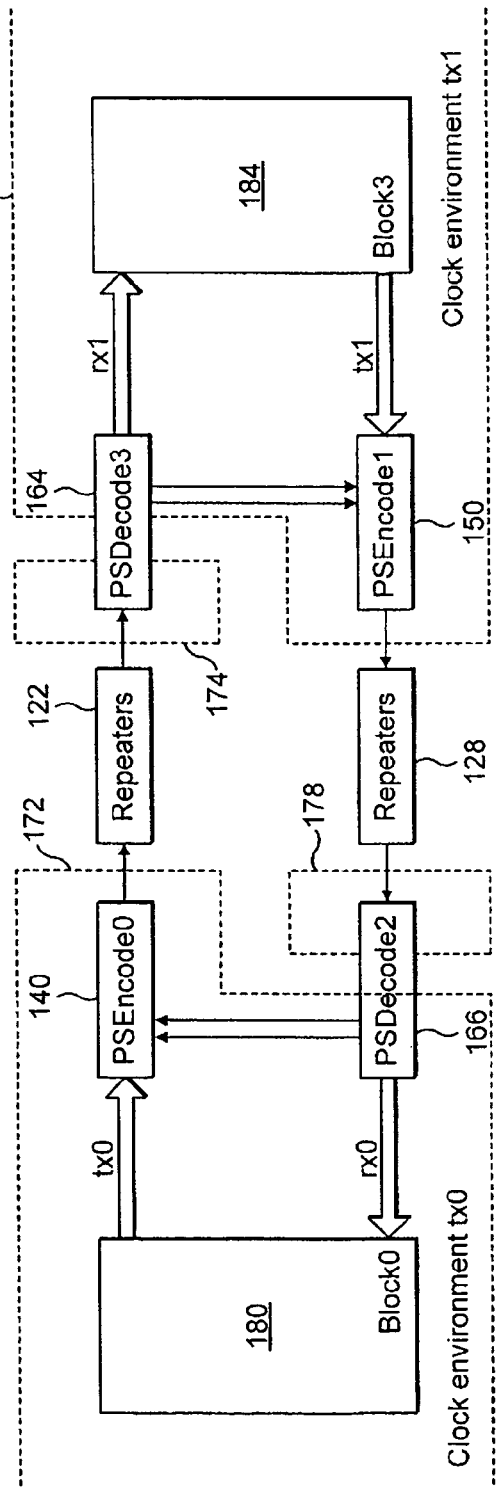
FIG. 13 illustrates a communications link in which embodiments of the present disclosure can be incorporated.

FIGS. 12 and 13 show the logic blocks associated with the transmitting and receiving modules. FIG. 12 shows a communication link in which the transmitting module comprises logic block 180, and a receive module comprises logic block 182. FIG. 12 shows the case in which logic block 182 is a relatively small logic block. In this case, the entire received module may be clocked by the clock received via the pulse serial link at the decode block 144. This is shown by clock environment rxl in FIG. 12. The decode block 144 does not need to include the dual port buffer. The other encode and decode blocks and the repeaters in FIG. 12, which are numbered the same as FIG. 11 are identical to these blocks and will not be discussed in detail. The transmit circuitry is the same as shown in FIG. 11, however in this circuit the logic block1, labelled 182 in the received module is small, and can therefore be clocked by a buffered version of the clock extracted from the received pulse stream. All of the logic in this clock environment (clock environment rx1) is synchronous and there is no need for a clock boundary crossing dual port buffer in the receiver (PSDecode1).

Having synchronous decode and encode blocks in the receive module is advantageous because of the reduced amount of logic required in the receiver (PSDecode1). It also means that the arrangement is asymmetric in that receivers at either end of the link (PSDecode1, PSDecode2) are not the same, and this may not be so desirable.

A problem arises if the given logic block in the receive circuit is not small. For a larger block, a significant delay through clock tree is required to achieve a balanced clock tree to all end points with the logic block. So for practical purposes, the clock for the receiver must be considered a separate environment to the clock within the given block. This is shown in FIG. 13, in which the circuitry is identical to FIG. 11, however the logic block block3 184 replaces block1 182. Logic block 184 is large, and therefore an extensive clock tree will be required in order to transmit the clock to all parts of the logic block 184, resulting in significant delay between the clock received by the decode block 164.

In the circuit in FIG. 13, the two decode blocks PSDecode3 and PSDecode2, labeled 164 and 178 respectively, require circuitry to synchronize signals from the first clock environment to the second clock environment. For example, PSDecode3 receives timing information according to clock environment 174, which is the timing information encoded in the pulse serial link as received at the PSDecode3 block. However, logic block 184 operates at a different clock phase, the clock phase of clock environment tx1. In this embodiment, the clock of clock environment tx1 is derived from a clock received by the pulse serial link, however it will be a delayed version of this clock, due to the necessity of a number of buffers and a clock tree to provide a clock to all parts of the logic block. This synchronization could be performed by a dual port buffer as described above, however this has the disadvantages discussed earlier such as the associated time delay caused by this type of synchronization. Instead isochronous synchronization circuitry is used as will now be described.

Figure 16:
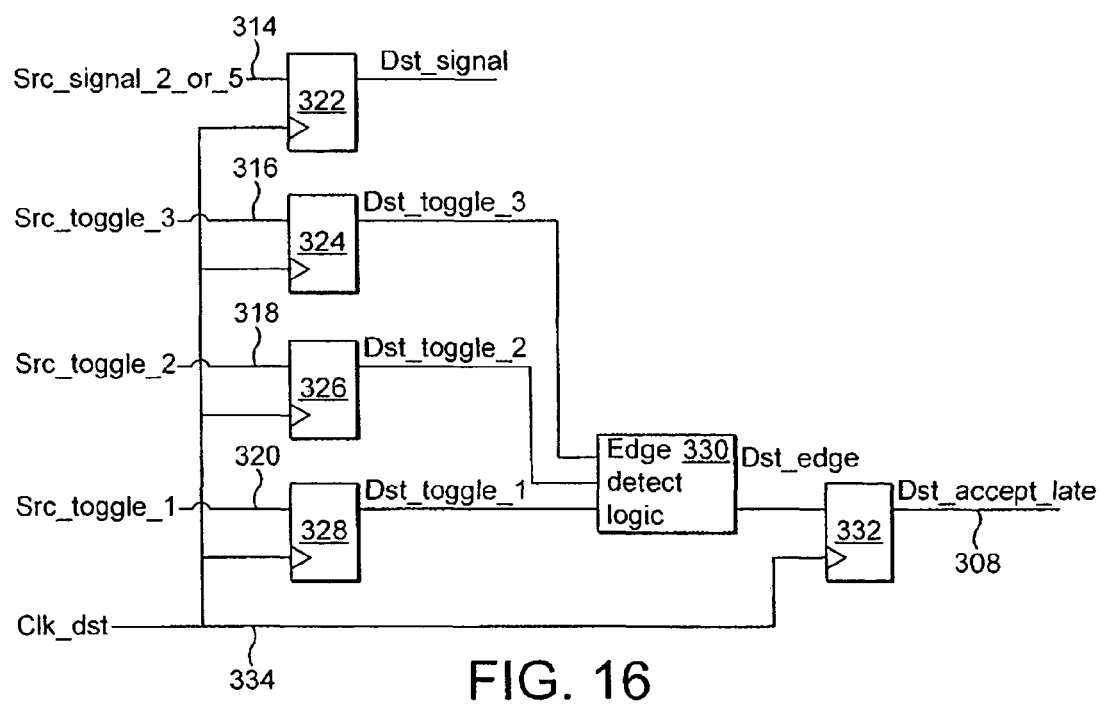
FIG. 16 illustrates synchronization circuitry in the receive clock environment according to one embodiment of the present disclosure.
Figure 15:
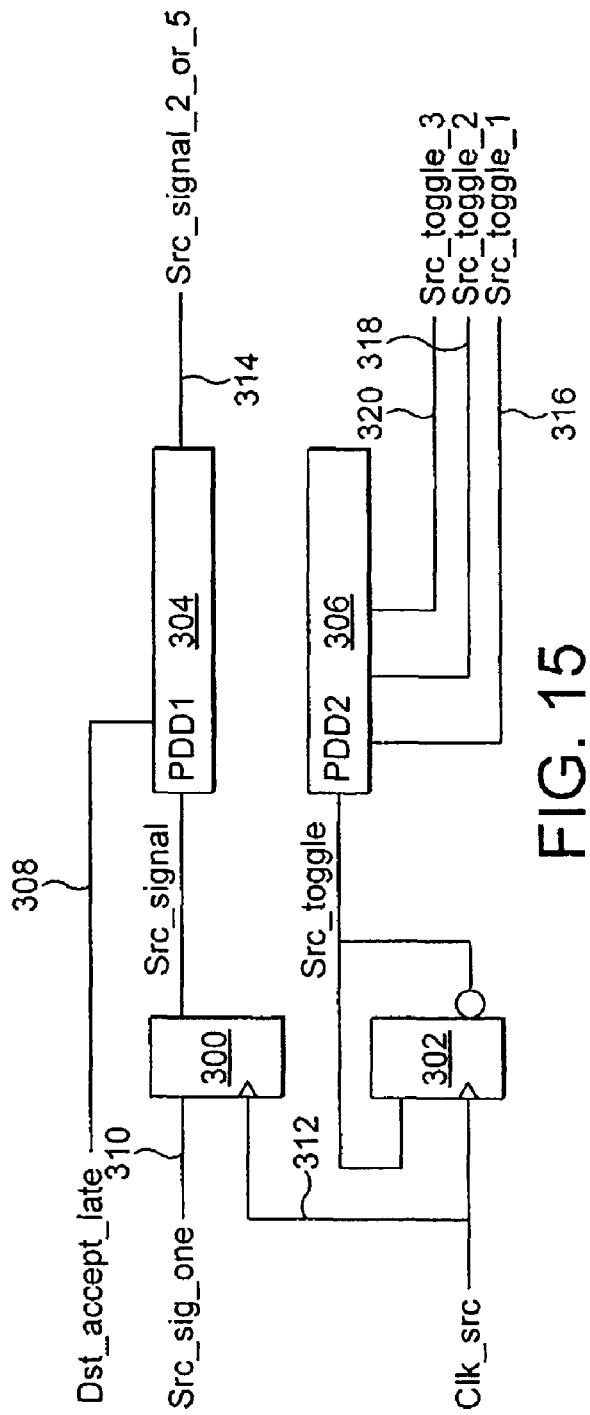
FIG. 15 illustrates synchronization circuitry in the transmit clock environment according to one embodiment of the present disclosure.

Isochronous synchronization circuitry will now be described with reference to FIGS. 15 to 19. FIGS. 15 and 16 show circuitry that is incorporated in the transmitting clock environment and the received clock environment respectively. For example, the circuit of FIG. 15 is included in the PSDecode3 block 164 of FIG. 13, within the clock environment 174. The circuit of FIG. 16 is included in the PSDecode3 block 164 within the clock environment 176.

FIG. 15 comprises flip-flops 300 and 302, each clocked by a clock signal clk_src 312. The input of flip-flop 300 is connected by a line 310 to source signal src_sig_one. The output of flip-flop 300 is connected to a first programmable digital delay line (PDD) 304. PDD 304 is controlled by signal dst_accept_late on line 308 such that the output signal from PDD 304 on line 314 comprises the src_signal delayed by 2 or 5 delay elements. The output of flip-flop 302 is inverted, and provided to its input. This output is also provided to a second programmable digital delay line PDD 306. This input at PDD 306 effectively toggles between high and low on the rising edges of clk_src. PDD 306 provides three output signals src_toggle_1, src_toggle_2 and src_toggle_3 on lines 316 to 320 respectively.

The signal which needs to cross from the source environment to the destination environment is src_signal. This is shown coming from flip-flop 300 clocked by clk_src, to demonstrate the synchronous nature of this signal with respect to clk_src, though this flip-flop is not part of the circuitry for the isochronous synchronizer. First PDD 304 delays src_signal by either 2 units when dst_accept_late is not asserted, or 5 units when dst_accept_late is asserted, to create the signal src_signal_2_or_5. Flip-flip 302 and the second PDD 306 are designed to ensure that src_toggle_2 is aligned with src_signal_2_or_5 when dst_accept_late is unasserted.

The circuitry in FIG. 16 comprises four flip-flops 322 to 328, edge detect logic block 330 and a fifth flip-flop 332. The three outputs of the second PDD block 306 of FIG. 15 are provided to the inputs of flip-flops 324 to 328 respectively. These flip-flops are clocked by a clock in the destination clock environment labeled clk_dst. The output from flip-flops 324 to 328 are connected to edge detect logic block 330, the output of which is provided to the fifth flop-flop 332, which is also clocked by clk_dst. The output of flip-flop 332 provides the dst_accept_late signal to the circuitry of FIG. 15 on line 308. Finally, the output from first PDD block 304 in FIG. 15 is connected the input of flip-flop 322 in FIG. 16. Flip-flop 322 is also clocked by clk_dst, and the output of this flip-flop provides the synchronized output signal dst_signal.

Operation of the circuitry of FIGS. 15 and 16 will now be described. First PDD 304 will generate a signal src_signal_2_or_5 which is safe to be clocked by flip-flop 322 in the destination clock environment without metastability risks. This is because if a metastability risk occurs due to the relationship between the source and destination clock environments, dst_accept_late is asserted, which will delay the src_signal by five units rather than two at the output 314, thus avoiding the problem.

Dst_accept_late is generated by edge detect logic 330, based on the outputs of the second PDD 306. As explained above, src_toggle_2 is arranged to be aligned with src_signal_2_or_5 when dst_accept_late is not asserted. Signals Src_toggle_1 and src_toggle_3 are arranged to be timed such that their rising edges occur before and after src_toggle_2, their timing being determined by the separation of the successive steps in second PDD 306. This step delay is small compared to the clock period and preferably a little larger than the sum of the setup time and hold time for the flip-flops. The variously delayed toggle signals, src_toggle_1, src_toggle_2, and src_toggle_3, generated by the second PDD 306 are captured in the clk_dst clock environment as dst_toggle_1, dst_toggle_2, and dst_toggle_3 by flip-flops 324 to 328. This circuitry effectively samples the source toggle signals on rising edges of the destination clock. Edge detect logic 330 examines the outputs from these flip-flops to determine whether or not there is a metastability risk requiring the dst_accept_late signal to be asserted.

The three flip-flops 324 to 328 are all subject to potential metastability. The three signals dst_toggle_1, dst_toggle_2, and dst_toggle_3 change following each clock edge of clk_dst. Their values may be represented, in each clock cycle, by the Boolean levels, 0 and 1, with R and F used to indicate potential metastability hazards. R and F indicate that an edge, R for rising, F for falling, may occur at some undeterminable time during the clock period. These three signals remain static for a given phase relationship. The table in FIG. 17 represents a range of possible phase relationships between clk_src and clk_dst.

Due to metastability in these destination toggle signals, the combination of these signals in the edge detect logic 330 may also be metastable, and consequently the output of flip-flop 332 which is dst_accept_late on line 308 may also be metastable. However, the signal, dst_accept_late, is static and remains constant for a given phase relationship between clk_src and clk_dst, so even if there is a metastability risk for the first few clock cycles, this signal quickly reaches a stable state. It does not need to be synchronized when it is passed back into the clk_src environment, a) because it is static, and b) because it is not used as a signal feeding to any logic clocked within the clk_src environment.

Figure 17:
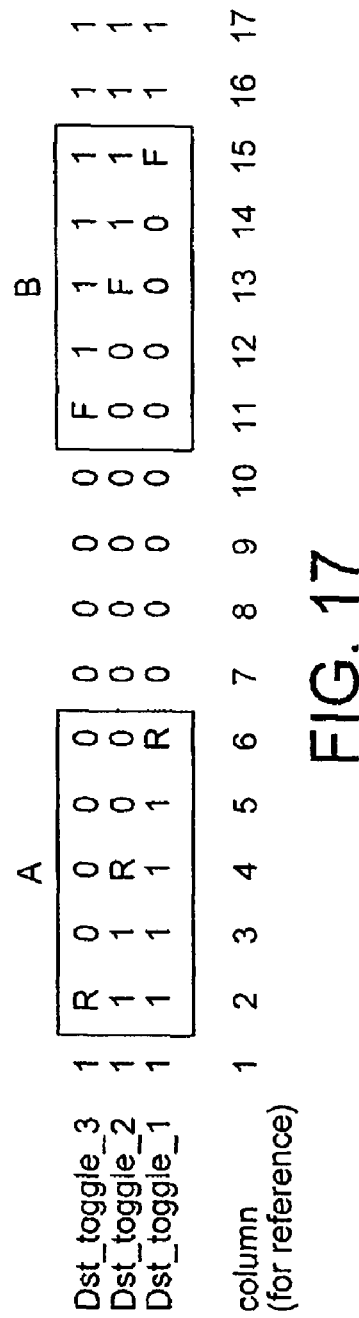
FIG. 17 illustrates operation of edge detect logic in the circuit of FIG. 16.

The edge detection logic simply looks for when the three destination toggle signals are not the same, that is not 111 and not 000, and this can be represented as either box A or box B shown in FIG. 17. If the signals are any of the combinations in boxes A or B, there is potential metastability in flip-flop 322, and therefore dst_accept_late is asserted.

It is important to note that there should never be more than one edge within the time period of the three toggle signals. A maximum of only one of these signals can be metastable, although it is not possible to determine which of these signals, if any, is metastable. For example, it would be impossible to distinguish between columns 3, 4 and 5 of FIG. 17.

However, "near mestastability" can be detected on signal dst_toggle_2 in FIG. 16, also illustrated on the second row of FIG. 17. The delay of src_toggle through the second PDD 306 to its second output src_toggle_2 318 is arranged to be approximately the same delay as src_signal through the first PDD 304, when dst_accept_late is unasserted. Therefore any edges on src_toggle_2 318 should be approximately aligned with edges on src_signal_2_or_5 314 (when dst_accept_late is unasserted). It follows that if flip-flop 326, with output dst_signal, is near metastability, then flip-flop 322, with output dst_toggle_2, is also near metastability. Mestastability on dst_signal is to be avoided, so if near metastability is detected on dst_toggle_2, then dst_accept_late is asserted to move the timing of src_signal_2_or_5 so that it is not close to clocking edge of clk_dst at flip-flop 322.

Detection of near mestastability on dst_toggle_2 is accomplished by examining the states of the two signals with adjacent timing relationships, dst_toggle_1 and dst_toggle_3. If dst_toggle_3 is different from dst_toggle_2, as in columns 2, 3, 4, 11, 12 or 13 of FIG. 17, then dst_toggle_3 could be metastable, or dst_toggle_2. In a subsequent cycle the edge might be "after" dst_toggle_3, where the R in column 2 becomes a 1, represented by column 1, or "before" dst_toggle_2, where the R in column 4 becomes a 0, represented by column 5. In other words, an edge detected as between dst_toggle_3 and dst_toggle_2 in one cycle might appear as an edge after dst_toggle_3, or between dst_toggle_2 and dst_toggle_1 in another cycle. Similarly, an edge detected as between dst_toggle_2 and dst_toggle_1 in one cycle might appear as an edge between dst_toggle_3 and dst_toggle_2, or earlier than dst_toggle_1 in another cycle. The edge detection can never move to more than one position away from its alternative. So if an edge is detected between any of dst_toggle_3, dst_toggle_2 and dst_toggle_1, then dst_toggle_2 is considered to be near metastability, in which case it is safe to use a later version of the src signal, for instance delayed by 5 units, when dst_accept_late is asserted.

Conversely, if an edge is neither detected between dst_toggle_3 and dst_toggle_2 nor between dst_toggle_2 and dst_toggle_1, then in a subsequent cycle, only dst_toggle_3 could be different, or dst_toggle_1, could be different. In other words dst_toggle_2 must be stable.

If an edge is not detected, as denoted by the region outside the boxes, then dst_toggle_2 is stable, and therefore it is safe to use the early version of the src signal, src_signal_2_or_5, delayed by 2 units when dst_accept_late is unasserted.

The circuit described has the advantage of comprising a relatively small amount of logic, with only 6 flip-flops and associated gates for logic and delays.

Supposing that the edge is detected between dst_toggle_3 and dst_toggle_2 in one cycle, and after dst_toggle_3 in another cycle, also that this detection alternates on successive clock cycles. This would mean that dst_accept_late would toggle, and that the timing of src_signal_2_or_5 would be changing on successive cycles. This situation is safe, because both timing positions 2 and 5 are away from positions 3 and 4 where the edges occur. It must be ensured that the programmable delay implements a clean switch between these two timing positions.

If, instead of a clean alternation between the position indicated by dst_toggle_3 and the position after dst_toggle_3, dst_accept_late suffers from metastability effects and transitions at an arbitrary time between successive clock edges, this could in turn lead to metastability on src_signal_2_or_5, and even metastability on dst_signal. However, this propagation of metastability already passes through 3 flip-flops, which is thought adequate for up to 333 MHz (assuming metastability threshold of 10 ns). If the metastability threshold is lower, such as 2.5 ns, then clock frequencies over 1 GHz would be safe.

Where the metastability risk is judged to be unacceptable, then further flip-flops can be added in the path of dst_accept_late. This does not change the low latency characteristic of the design, it just increases the area (and the number of clock cycles for the initial lock).

In order to keep dst_accept_late static some storage or hysteresis could be added. One approach to this would be to "lock" the value dst_accept_late as soon as it is first determined. However, this is not an ideal solution as dst_accept_late must be allowed to change to accommodate gross changes in voltage, temperature, and even process (lifetime degradation of devices). Also, dst_accept_late would need to change if the source clock was stopped and then restarted coming from a different source, or down a different path. Therefore, hysteresis is preferably built into dst_accept_late, such that it remains stable for a certain number of cycles, but does not take too long to lock into a change in source.

In this case dst_accept_late should now be considered to be a dynamic signal, passing from the destination clock environment to the source clock environment, and therefore metastability becomes a problem. The change to the programmable delay of the first PDD 304 must happen at a safe time with respect to src_signal, which is being delayed. For this reason, resynchronization is added such that dst_accept_late is resynchronized into the source clock environment as src_accept_late. This is shown in FIG. 18.

Figure 18:
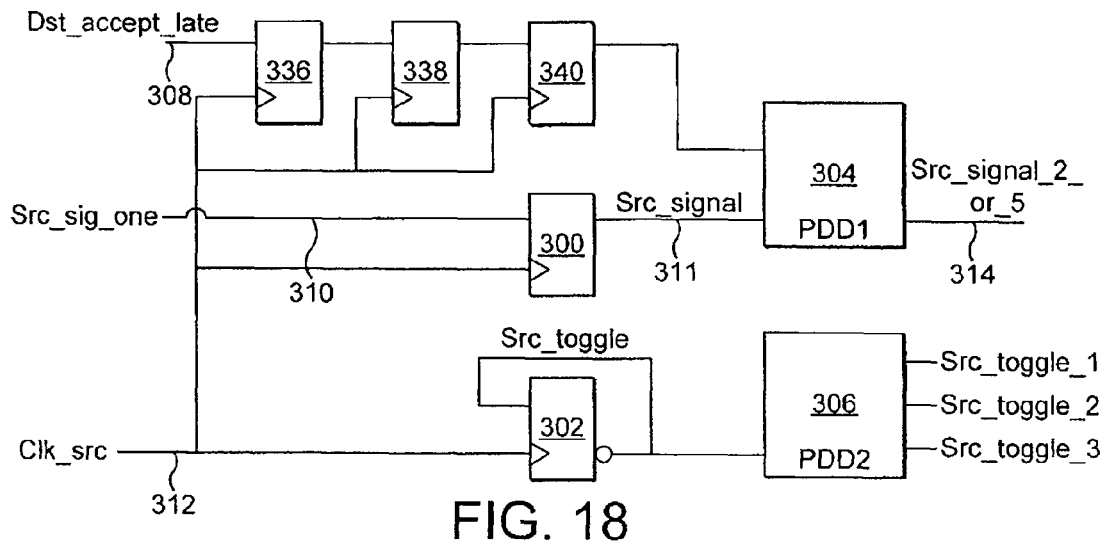
FIG. 18 illustrates an alternative embodiment of synchronization circuitry in the transmit clock environment according to the present disclosure.

FIG. 18 shows the circuitry in the source clock environment which includes a further three flip-flops 336 to 340 clock by clk_src, which the signal dst_accept_late is fed through, to avoid metastability in this signal. Other components in the circuit of FIG. 18 are the same as those in the circuit of FIG. 15 and will not be described again.

Figure 19:
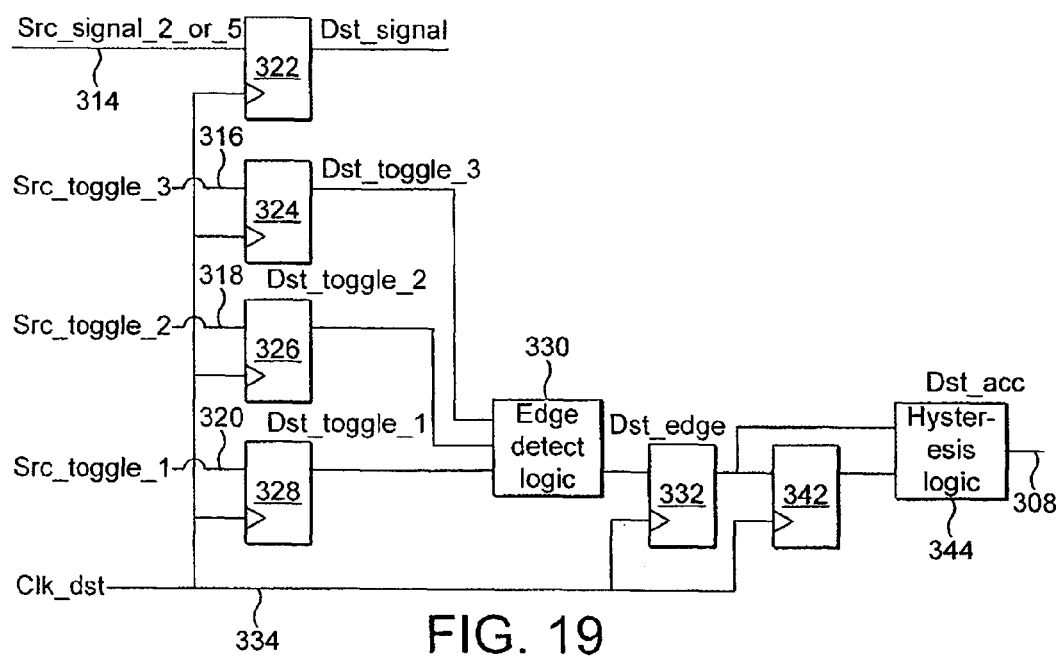
FIG. 19 shows synchronization circuitry in the receive clock environment according to the alternative embodiment of present disclosure.

FIG. 19 shows the circuitry in the destination clock environment that now includes a further flip-flop 342, clocked by clk_dst, for avoiding metastability in the dst_accept_late signal. A hysteresis logic block 344 is also provided in series with the flip-flop for adding hysteresis to the dst_accept_late signal. For example, the hysteresis logic of block 344 could cause an update of the value of dst_accept_late 308 when the outputs of both flip-flops 332 and 342 are the same. Further flip-flops 342 may be added to provide greater hysteresis.

Note that because src_accept_late could still oscillate between early and late, dst_signal is not a clock cycle accurate copy of src_signal. Any given edge on src_signal may appear on dst_signal in either the following cycle, or the cycle after that. For instance, a pulse on src_signal lasting one clock cycle, could appear on dst_signal as a pulse of lasting one or two clocks, or worse, it could be lost. Therefore, an appropriate signaling protocol must be used for signals crossing the isochronous boundary. For example, a double handshake protocol as described above should be used, and appropriate logic provided for implementing this. Alternatively, a non-return to zero (NRZ) protocol could be used where the change in value, from 0 to 1, or from 1 to 0, represents a logic 1 (and no change represents logic 0); and successive changes are at least two cycles apart.

Figure 20:
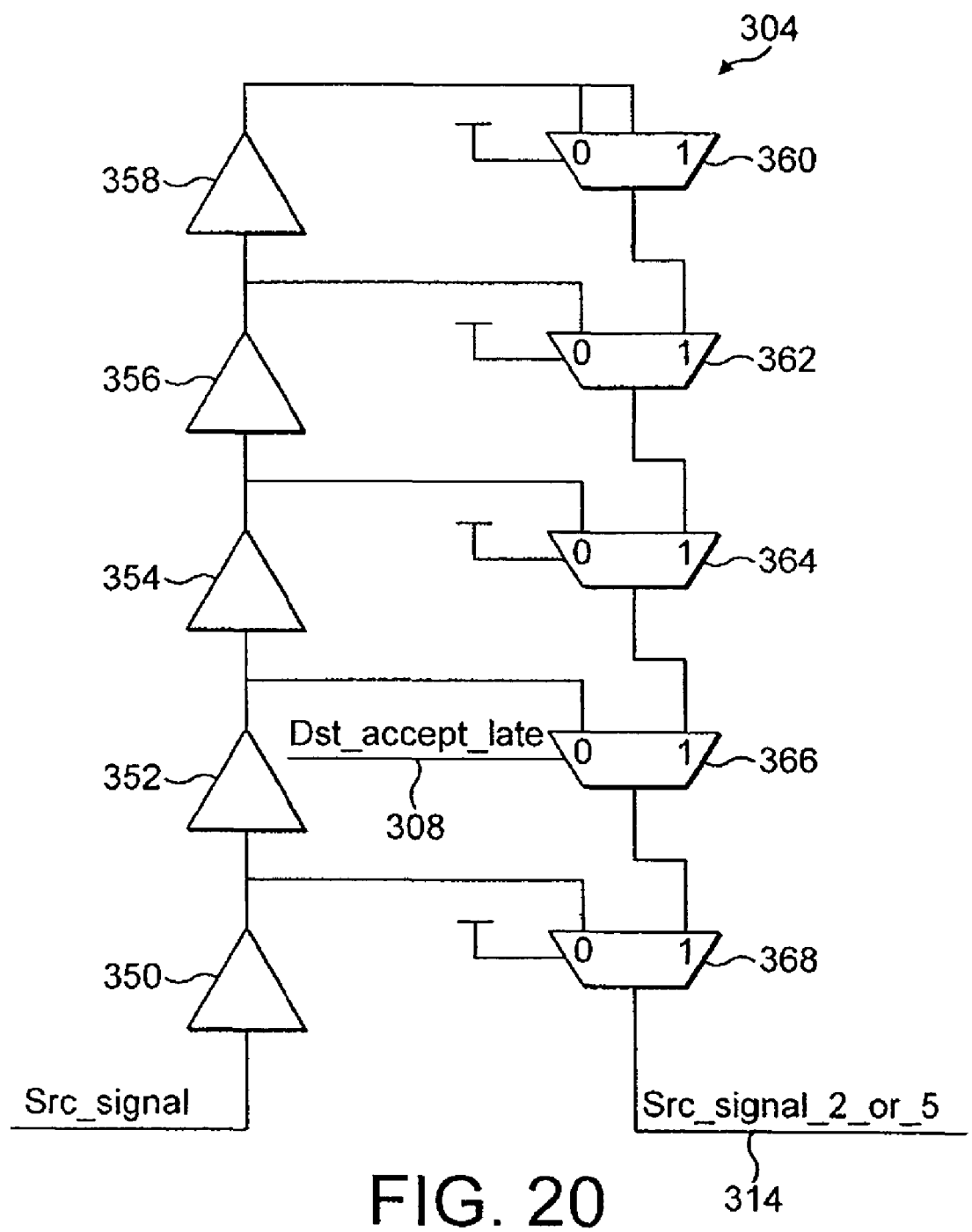
FIG. 20 shows the programmable delay circuitry for delaying the source signal of FIG. 15 or 18 in greater detail.

Referring now to FIG. 20, this figure shows an embodiment of the programmable digital delay block 304 of FIGS. 15 and 18. As shown, PDD 304 has a similar structure to the PDD of FIG. 6, however only one control signal is necessary in order to switch between two and five delay elements. Five delay elements are arranged in series, labeled 350 to 358, the output of each being connected to the input of the next and to a first input of a respective two-input multiplexer. The five multiplexers are labeled 360 to 368, and are connected in series, with the outputs of multiplexers 360 to 366 being connected to the second input of the next multiplexer in line, and the output of multiplexer 368 providing the delay line output src_signal_2_or_5 on line 314.

Operation of the circuit of FIG. 20 is very similar to that of FIG. 6 and will therefore not be discussed in detail. The difference in this circuit is that the control inputs to multiplexers 360, 362, 364 and 368 are all connected to logic '1' such that their '1' inputs are all connect to their respective output. The control input to multiplexer 366 however is connected to line 308 shown in FIG. 15, such that it is controlled by the signal dst_accept_late. If this signal is asserted all five delay elements in the circuit will be selected for output, otherwise only two will be selected.

Figure 21:
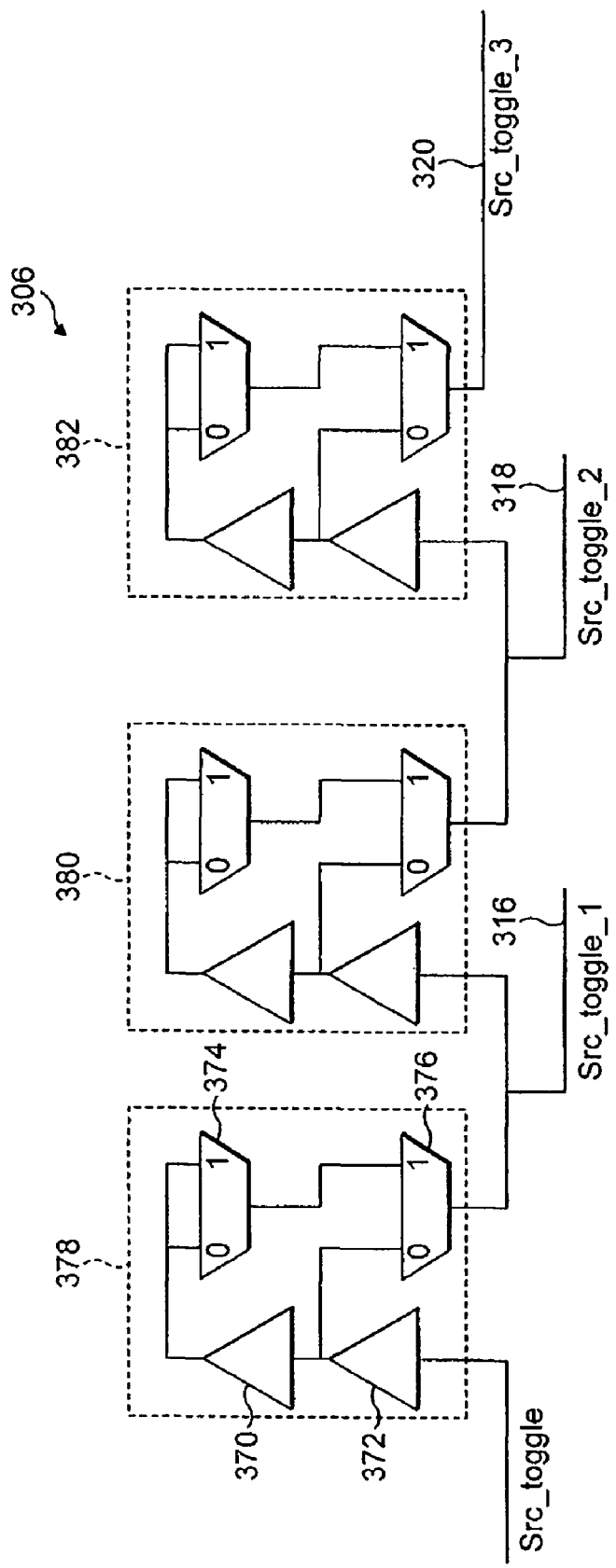
FIG. 21 shows the programmable delay circuitry for generating the timing signals of FIG. 15 or 18 in greater detail.

FIG. 21 shows an embodiment of the PDD 306 of FIGS. 15 and 18 in more detail. As shown in this embodiment this circuitry in fact comprises three relatively small PDDs 378, 380, 382, arranged in series, the output of each providing one of the toggle outputs. The first PDD 378 comprises two delay elements 370 and 372 and two multiplexers 374 and 376. These are arranged in a similar fashion to the delay circuits of FIGS. 6 and 20. In this circuit, multiplexer 376 is controllable such that PDD 378 provides a delay of one or two delay elements. PDDs 380 and 382 are the same as PDD 378 and will not be discussed in detail.

The output from PDD 378 provides signal src_toggle_1, and is also connected to the input of PDD 380. The output of PDD 380 provides signal src_toggle_2, and is connected to the input of PDD 382. The output of PDD 382 provides signal src_toggle_3. The three PDDs 378, 380 and 382 are programmable via the control input to multiplexer 376 and control inputs to the equivalent multiplexers in PDD 380 and 382. It is preferable for src_toggle_2 to be aligned with the output of PDD 304 when dst_accept_late is not asserted, which means that a delay of two delay elements is required. If delay elements in PDD 304, 378 and 380 are identical, this means that PDDs 378 and 380 should each be programmed to give a delay of one delay element such that src_toggle_2 has a delay of two delay elements after the rising edge of clk_src. It will be apparent that in alternative embodiments these delay lines could be non-programmable, and comprise only one delay element each.

When embodiments of isochronous synchronizing circuitry as described above are used in the application involving the pulsed serial link described above, the source may be switched dynamically, and therefore it may be necessary to allow for additional cycles prior to data transfer. This may also be necessary if calibration is used as described in co-pending application (PWF: 307989). However, the frequency at which the source is changed from one source to the next should be sufficiently low such that any metastability issue arising from this scenario can be safely ignored.

According to some embodiments the first and second clock environments may have clock frequencies that are nominally the same, but are not identical, such that the clock sources are derived from completely independent clock circuitry, for example not on the same chip, using separate phase locked loops, or using separate reference (crystal) sources. In this case, the relationship between the two clocks can be considered identical for a short period of time, but the phase relationship is both unknown, and continuously slowly drifting. The embodiments described above would function equally well with these signals, however, one additional factor that needs to be considered is that at infrequent intervals the second clock will have one more or one less clock edge than the first clock. This will seen as the dst_accept_late changes and one period of data will be lost or gained. Provided the data transfer protocol is tolerant of such gain or loss of one clock cycle, the above circuitry can be used, providing the advantages of low latency.

An example has been given above in which the timing of the source signal src_signal is altered by a first delay provided by two delay elements, or a second delay value provided by five delay elements, controlled by the signal dst_accept_late. It will be apparent to those skilled in the art that this the number of delay elements and thus the delays should be chosen depending on the requirements of the system. The second delay should be chosen such that the delay between the first and second delays is larger than the sum of the setup delay plus hold time of a flip-flop and is thus sufficient to move an edge from a region of potential metastability to a safe timing region.

The isochronous synchronization circuitry described above can be utilized in any number of applications in which the timing of clock signals in the clock environments have a relatively stable relationship with respect to each other, because they have the same frequency but an unknown phase offset. In situations where a control signal is transmitted from one clock environment to many different clock environments, it will be necessary to use both the source and destination isochronous circuitry for each link.

Figure 22:
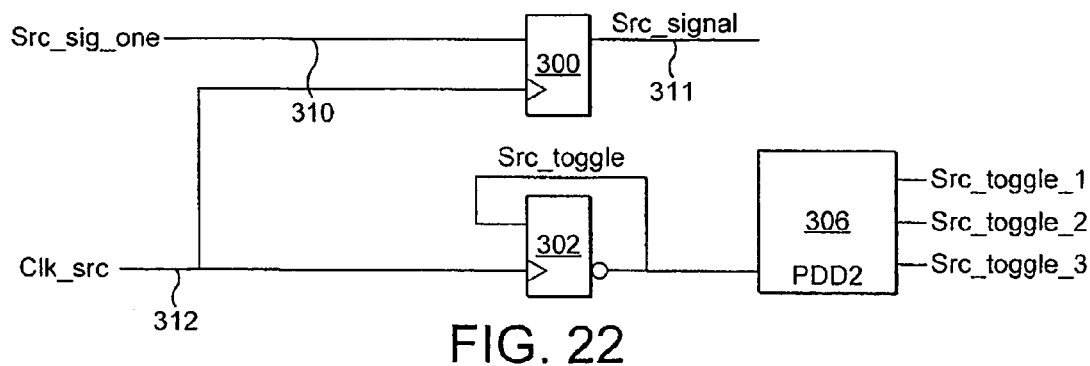
FIG. 22 shows an alternative embodiment of synchronization circuitry in the transmit clock environment.
Figure 23:
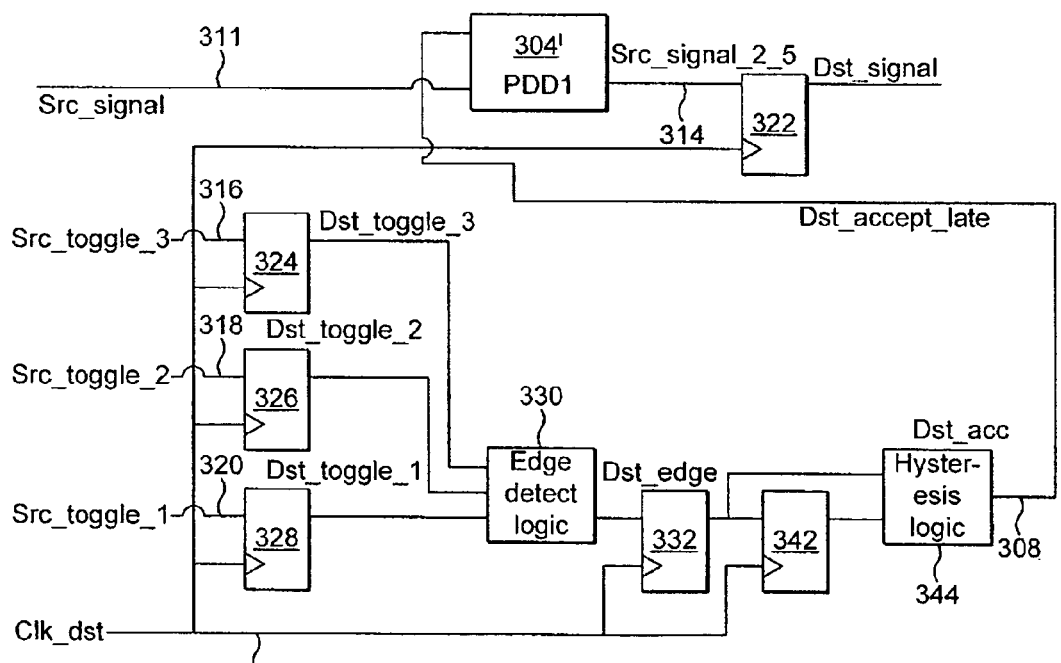
FIG. 23 shows an alternative embodiment of synchronization circuitry in the receive clock environment.

In the above described embodiments, the circuitry for receiving the control signal dst_accept_late is passed back into the first clock environment and used to control the transfer time src_signal 311. However, it is also possible to use the control signal dst_accept_late 308 in the second clock environment to control reception of the signal src_signal 311. Reference is now made to FIGS. 22 and 23 to illustrate an embodiment where this is the case. The circuitry of FIGS. 22 and 23 are similar in many respects to that of FIGS. 18 and 19 and like numerals denote like parts. Only the differences will be discussed here.

In the first clock environment, the first programmable digital delay 304 is no longer present, and of course the metastability flip-flops are also not required. The signal src_signal 311 is passed directly from the first clock environment to the second clock environment, together with the three output signals from the PDD 306.

The programmable digital delay, labeled 304' in FIG. 23, is instead located in the second clock environment and receives the signal src_signal 311. It still serves to provide a variable delay as the signal src_signal 311 crosses from the source clock environment to the destination clock environment, but in this case it gates it on the receive side to control its reception time. It provides output signal src_signal 2 or 5, 314, as before to flip-flop 322, which outputs dst_signal as before.

The term "transfer time" is used herein to denote the crossover time of src_signal from the source clock environment to the destination clock environment, whether this is the transfer time controlled on the source side, or the reception time on the destination side.

The application hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present disclosure may consist of any such feature or combination of features. In view of the foregoing description it will be evident to a person skilled in the art that various modifications may be made within the scope of the disclosure.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. Circuitry for synchronizing communications between clock environments wherein a change of state is transmitted from a first clock environment to a second clock environment, the first clock environment being timed by a first clock signal and the second clock environment being timed by a second clock signal, the first and second clock signals having nominally the same frequency but an unknown phase relationship, the circuitry comprising:
    delay circuit in the first clock environment arranged to generate a plurality of timing signals by delaying said first clock signal by respectively different delay values;
    a sampler in the second clock environment arranged to sample said plurality of timing signals at substantially said frequency of said second clock signal thereby generating a plurality of sampled timing signals; and
    a determining circuit arranged to generate a control signal based on said plurality of sampled timing signals and outputting said control signal for controlling the transfer time of said change of state.

2. The circuitry according to claim 1, wherein said determining circuit generates said control signal based on whether said plurality of sampled timing signals indicate a clocking edge of said first clock signal.

3. The circuitry according to claim 1 further comprising:
    a programmable delay circuit arranged to receive said control signal from said determining circuit and to delay the transfer of said change of state based on said control signal.

4. The circuitry according to claim 3, wherein said programmable delay circuit is arranged to delay the transfer of said change of state by a first delay value, or a second larger delay value based on said control signal.

5. The circuitry according to claim 4, wherein said delay circuit is arranged to generate a first one of said timing signals by delaying said first clock signal by said first delay value, a second one of said timing signals by delaying said first clock signal by less than said first delay value, and a third one of said timing signals by delaying said first clock signal by greater than said first delay.

6. The circuitry according to claim 1, wherein said delay circuit comprises a plurality of programmable delay circuits arranged in series.

7. The circuitry according to claim 1, wherein said the control signal is supplied to the first clock environment which further comprises at least one synchronizer for retiming said control signal upon arrival in said first clock environment.

8. The circuitry according to claim 1 further comprising:
    hysteresis logic arranged to filter out unwanted rapid changes in said control signal.

9. The circuitry according to claim 1 further comprising:
    a first control circuit located in the first clock environment for using said control signal to control the transmission time of the change of state.

10. The circuitry according to claim 1 further comprising:
    a second control circuit located in the second clock environment for using said control signal to control the reception time of the change of state.

11. Decoding circuitry for decoding at least one data pulse received on a single line comprising the circuitry as claimed in claim 1.

12. A method of synchronizing communications between clock environments wherein a change of state is transmitted from a first clock environment to a second clock environment, the first clock environment being timed by a first clock signal and the second clock environment being timed by a second clock signal, the first and second clock signals having nominally the same frequency but an unknown phase relationship, the method comprising:
    generating, in the first clock environment, a plurality of timing signals by delaying said first clock signal by respectively different delay values;
    sampling, in said second clock environment, said plurality of timing signals at substantially said frequency of said second clock signal thereby generating a plurality of sampled timing signals; and
    generating a control signal based on said plurality of sampled timing signals and outputting said control signal for controlling the transfer time of said change of state.

13. The method according to claim 12, wherein said control signal is generated based on whether said plurality of sampled timing signals indicate a clocking edge of said first clock signal.

14. The method according to claim 12, wherein the transmission time of said change of state is delayed by a first delay value, or a second larger delay value, based on said control signal.

15. The method according to claim 14, wherein a first one of said plurality of timing signals is generated by delaying said first clock signal by said first delay value, a second one of said timing signals is generated by delaying said first clock signal by less than said first delay value, and a third one of said timing signals is generated by delaying said first clock signal by greater than said first delay.

16. The method according to claim 12, wherein the control signal is used in the first clock environment to control the transmission time of the change of state.

17. The method according to claim 16 further comprising:
retiming said control signal upon arrival in said first clock environment.

18. The method according to claim 12 further comprising:
delaying changes in said control signal prior to transmission to said first clock environment.

19. The method according to claim 12, wherein the control signal is used in the second environment to control the reception time of the change of state.

20. An isochronous synchronizer to synchronize communications between clock environments wherein a change of state is transmitted from a first clock environment to a second clock environment, the first clock environment being timed by a first clock signal and the second clock environment being timed by a second clock signal, the first and second clock signals having nominally the same frequency but an unknown phase relationship, the isochronous synchronizer comprising:

a first circuit arranged to detect a metastability risk caused by the relative timing of the first and second clock signals, said metastability risk detected by sampling a plurality of timing signals based on the first clock signal, wherein the plurality of timing signals are sampled at substantially the same frequency as the second clock signal; and a second circuit arranged to generate a control signal based on said detected metastability risk and to output said control signal to control a transfer time of said change of state.

* * * * *